United States Patent
Dudar

(10) Patent No.: US 10,774,725 B2
(45) Date of Patent: Sep. 15, 2020

(54) SYSTEMS AND METHODS FOR ENGINE COOLING DURING S/S EVENTS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 15/861,428

(22) Filed: Jan. 3, 2018

(65) Prior Publication Data

US 2019/0203630 A1 Jul. 4, 2019

(51) Int. Cl.
*F01P 1/02* (2006.01)
*F02D 41/00* (2006.01)
(Continued)

(52) U.S. Cl.
CPC .............. *F01P 1/02* (2013.01); *B60W 10/06* (2013.01); *B60W 10/30* (2013.01); *B60W 20/12* (2016.01); *B60W 20/40* (2013.01); *B60W 50/0097* (2013.01); *F01P 11/16* (2013.01); *F02B 39/10* (2013.01); *F02D 41/0007* (2013.01); *F02D 41/0072* (2013.01); *F02M 26/47* (2016.02); *B60W 2556/50* (2020.02); *B60W 2710/06* (2013.01); *F01P 2001/023* (2013.01); *F02D 41/008* (2013.01); *F02D 41/042* (2013.01);
(Continued)

(58) Field of Classification Search
CPC ........ F01P 1/02; F01P 11/16; F01P 2001/023; F02B 39/10; F02D 41/0007; F02D 41/0072; F02D 41/042; F02D 41/008; B60W 50/0097; B60W 20/40; B60W 10/30; B60W 2710/06; B60W 20/12; B60W 2550/402; F02M 26/47; F02N 11/0814; F02N 2019/008
See application file for complete search history.

(56) References Cited

U.S. PATENT DOCUMENTS 7,204,235 B1    4/2007  Gebby et al.
8,250,865 B2 *  8/2012  Pearson ................ F02M 26/24
                                                      123/41.08
(Continued)

OTHER PUBLICATIONS

Dudar, A., "Engine Cooling by Electrically Driven Intake Air Compressor," U.S. Appl. No. 15/786,325, filed Oct. 17, 2017, 63 pages.

*Primary Examiner* — Hung Q Nguyen
*Assistant Examiner* — Brian P Monahon
(74) *Attorney, Agent, or Firm* — Geoffrey Brumbaugh; McCoy Russell LLP

(57) ABSTRACT

Methods and systems are provided for reducing temperature of an engine or single cylinder(s) of the engine at start/stop events where the engine is stopped from combusting air and fuel, and in response to an overheating engine condition. In one example, a method comprises activating an electric air compressor to direct cooling air flow through a first single cylinder of the engine, to reduce a temperature of the first single cylinder to a desired temperature prior to a request to restart the engine. In this way, a single cylinder indicated to be overheating may be effectively cooled, without employing methodology that would otherwise cool the engine as a whole, which may thus prevent engine degradation and which may conserve power of an onboard energy storage device.

18 Claims, 7 Drawing Sheets

(51) Int. Cl.

| | | |
|---|---|---|
| *B60W 20/12* | (2016.01) | |
| *F02B 39/10* | (2006.01) | |
| *F02M 26/47* | (2016.01) | |
| *B60W 10/06* | (2006.01) | |
| *B60W 10/30* | (2006.01) | |
| *B60W 20/40* | (2016.01) | |
| *B60W 50/00* | (2006.01) | |
| *F01P 11/16* | (2006.01) | |
| *F02D 41/04* | (2006.01) | |
| *F02N 11/08* | (2006.01) | |
| *F02N 19/00* | (2010.01) | |

(52) U.S. Cl.
CPC ..... *F02N 11/0814* (2013.01); *F02N 2019/008* (2013.01)

(56) References Cited

U.S. PATENT DOCUMENTS

| | | | | |
|---|---|---|---|---|
| 9,217,379 | B2 * | 12/2015 | Willard | F02D 17/02 |
| 9,267,423 | B2 * | 2/2016 | Russ | F02B 37/162 |
| 2002/0157414 | A1 * | 10/2002 | Iwanami | B60H 1/00778 |
| | | | | 62/239 |
| 2003/0051692 | A1 * | 3/2003 | Mizutani | F02D 41/042 |
| | | | | 123/179.15 |
| 2006/0142928 | A1 * | 6/2006 | Yuya | F02D 41/042 |
| | | | | 701/112 |
| 2010/0174465 | A1 * | 7/2010 | Gibson | B60W 10/02 |
| | | | | 701/70 |
| 2010/0300383 | A1 * | 12/2010 | Pursifull | F02B 69/06 |
| | | | | 123/21 |
| 2012/0204827 | A1 * | 8/2012 | Sieber | F02D 41/0087 |
| | | | | 123/179.4 |
| 2012/0330522 | A1 * | 12/2012 | Gibson | B60W 10/06 |
| | | | | 701/70 |
| 2013/0005532 | A1 * | 1/2013 | Gibson | B60W 10/026 |
| | | | | 477/115 |
| 2013/0080036 | A1 * | 3/2013 | Yamauchi | F02D 41/042 |
| | | | | 701/112 |
| 2013/0098032 | A1 * | 4/2013 | Wade | F02B 37/18 |
| | | | | 60/602 |
| 2014/0149023 | A1 * | 5/2014 | Martin | F02P 9/00 |
| | | | | 701/113 |
| 2015/0285161 | A1 * | 10/2015 | Ulrey | B60W 20/16 |
| | | | | 477/3 |
| 2016/0303946 | A1 * | 10/2016 | Miller | B60W 10/08 |
| 2017/0058795 | A1 * | 3/2017 | Schmitt | F02D 41/0007 |
| 2017/0122234 | A1 * | 5/2017 | Kuechler | F02D 41/123 |
| 2017/0130664 | A1 * | 5/2017 | Rueger | F02B 39/10 |
| 2017/0284328 | A1 * | 10/2017 | Gallhuber | F02D 41/0087 |

* cited by examiner

SYSTEMS AND METHODS FOR ENGINE COOLING DURING S/S EVENTS

FIELD

The present description relates generally to methods and systems for controlling a vehicle's electrically-driven intake air compressor to cool an overheated vehicle engine.

BACKGROUND/SUMMARY

Vehicles may include a coolant system configured to reduce overheating of an engine by transferring the heat to ambient air. Therein, coolant is circulated through the engine block to remove heat from the hot engine, and the heated coolant is then circulated through a radiator near the front of the vehicle. Heated coolant may also be circulated through a heat exchanger to heat a passenger compartment. The coolant system may include various components such as various valves, pumps, and one or more thermostats. In the event of coolant system degradation due to component malfunction (e.g., water pump degradation), or due to loss of coolant from the cooling system (e.g., due to a coolant leak), the engine may overheat. Engine overheating may be exacerbated in turbocharged direct injected engines which tend to run hot due to boost and higher loads.

Various approaches have been developed to address engine overheating in the event of coolant system degradation. One example approach, shown by Willard et al. in U.S. Pat. No. 9,217,379, addresses engine overheating by alternately shutting down fuel to one or more cylinders while maintaining vehicle torque demand with the fueled cylinders. Cylinder cooling is achieved as cool un-combusted air flows through the unfueled cylinders. In still other approaches, cylinder fueling may be shut off on a bank-wise basis to cool the deactivated bank, while the active bank continues to generate torque for vehicle propulsion.

The inventors herein have recognized potential issues with the above approach. As one example, in engines configured with start-stop (S/S) capabilities, even with all cylinders deactivated, under-hood temperatures may continue to climb. Due to the vehicle being static and not moving, even if additional cooling fans are activated, the idle-stopped engine may continue to overheat. If the engine is restarted to increase cooling air flow, the fuel economy benefit associated with the start-stop operation may be compromised.

The inventors herein have developed systems and methods to at least partially address the above issues. In one example a method comprises activating an electric compressor in an intake of an engine of a vehicle, to direct an air flow through a first single cylinder of the engine during a start/stop event where the engine is not combusting air and fuel, to reduce a temperature of the first single cylinder to a desired temperature prior to a request to restart the engine. In this way, mitigating action may be taken at a S/S event for a single cylinder that is identified as overheating, which may prevent or reduce potential engine degradation stemming from the single overheating cylinder.

In one example of the method, the method further includes positioning the first single cylinder with both an intake valve and an exhaust valve of the first single cylinder in an at least partially open configuration, to direct the air flow through the first single cylinder. By positioning the first single cylinder as such, the first single cylinder may be effectively cooled during the S/S event.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
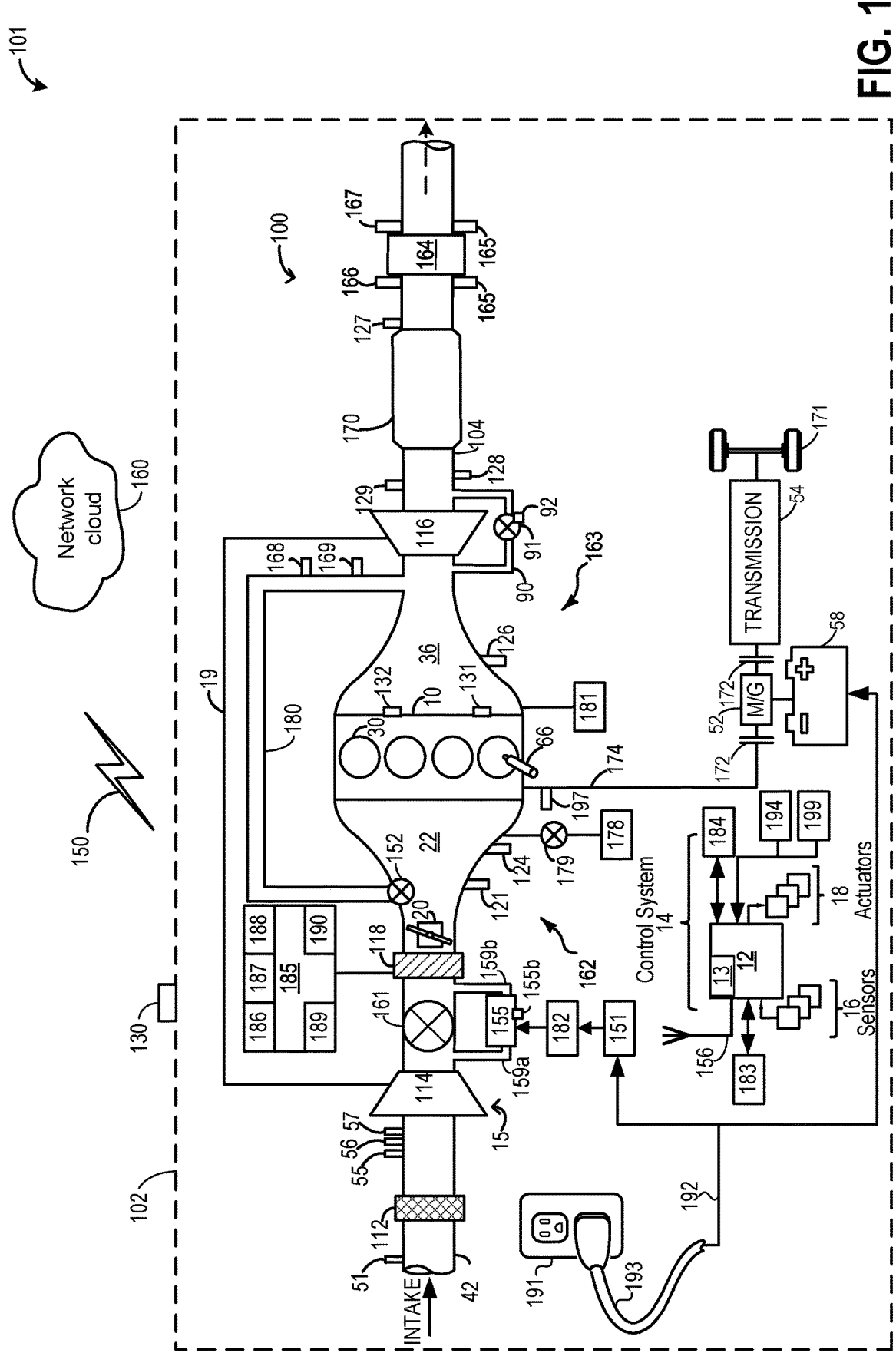
FIG. 1 schematically shows a vehicle system including an engine system.
Figure 2:
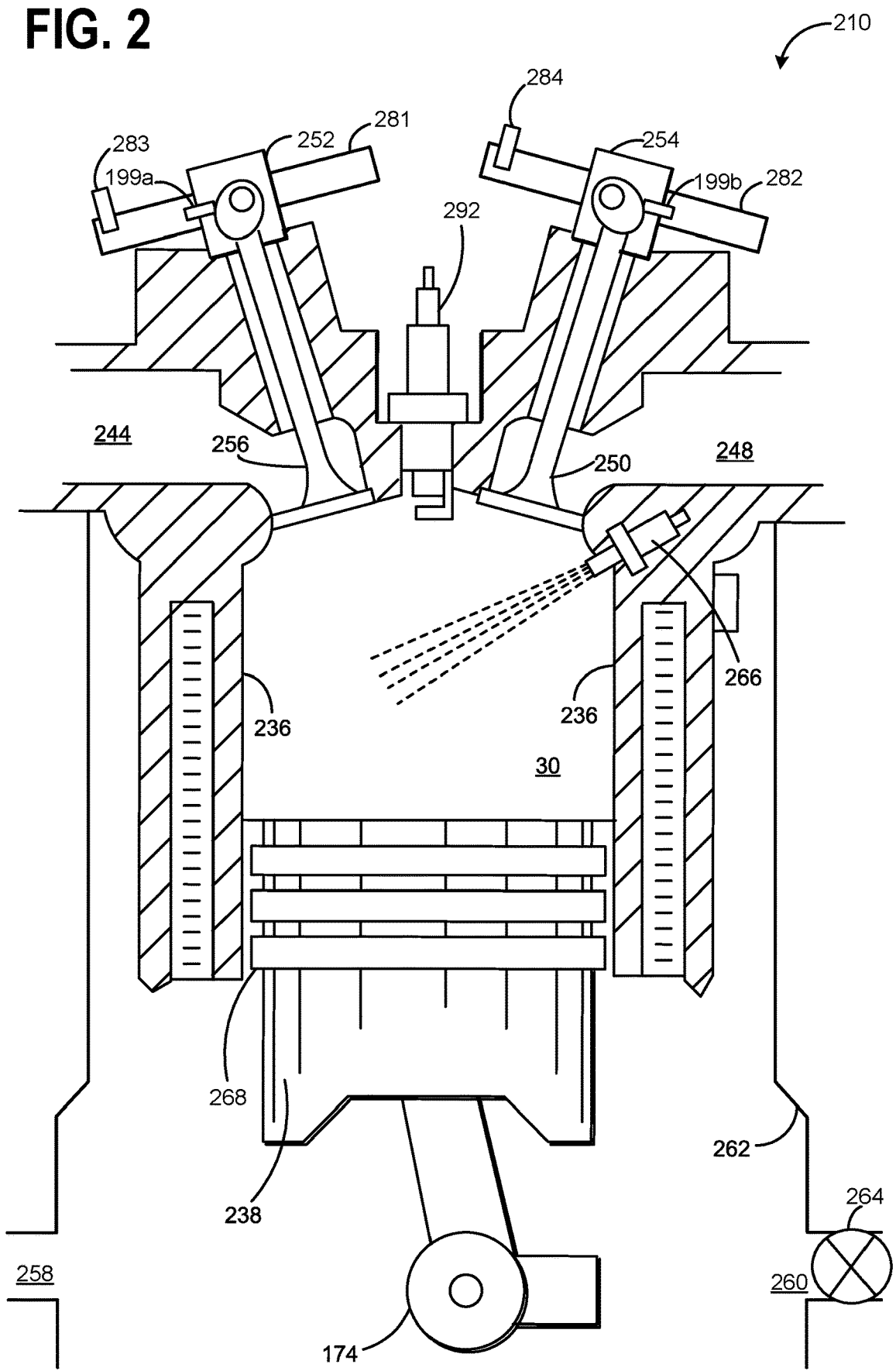
FIG. 2 schematically shows a single cylinder of the engine system of FIG. 1.
Figure 3:
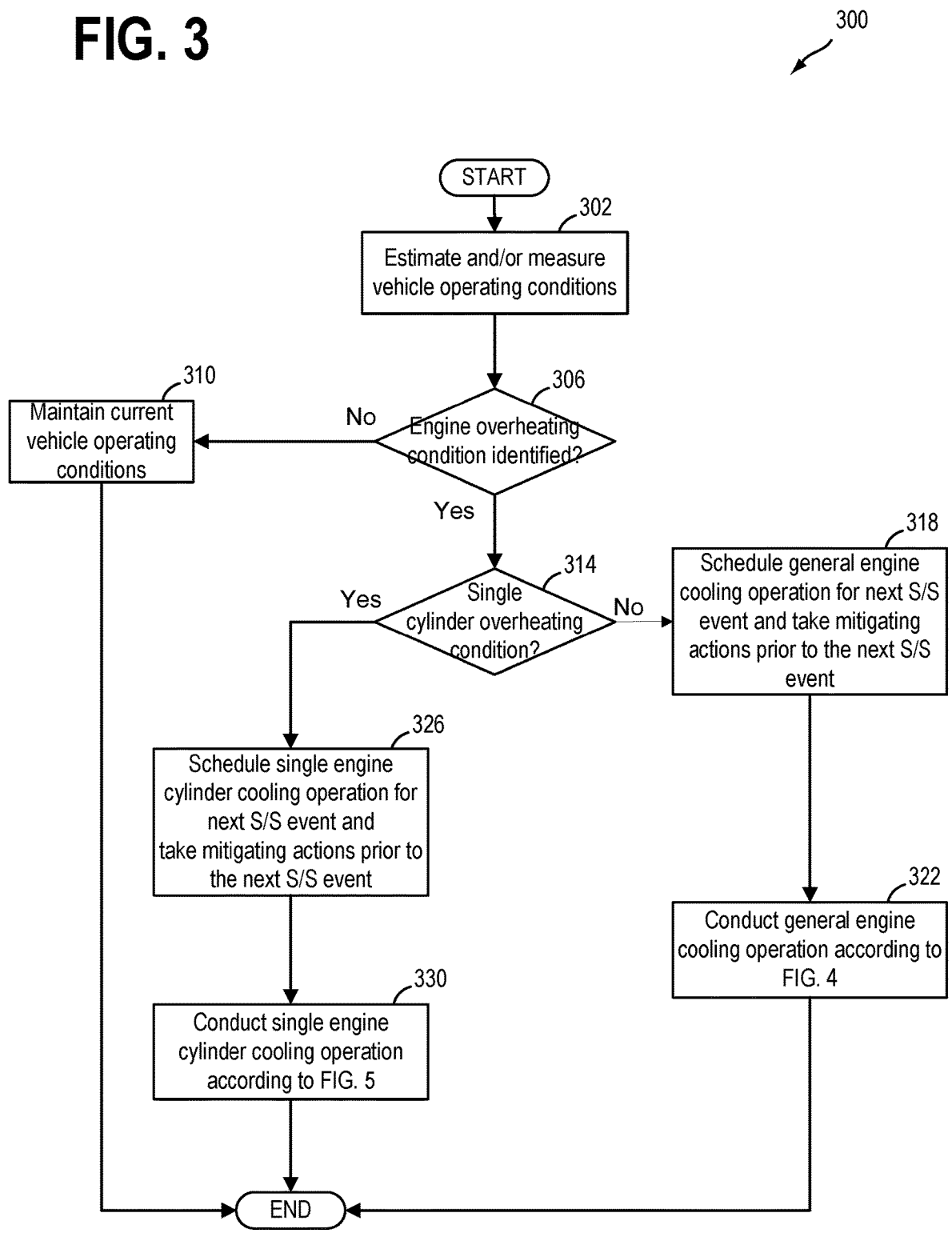
FIG. 3 illustrates a high-level example method for selecting whether to conduct a single engine cylinder cooling operation, or a general engine cooling operation, in response to an indication of an engine overheating condition.
Figure 4:
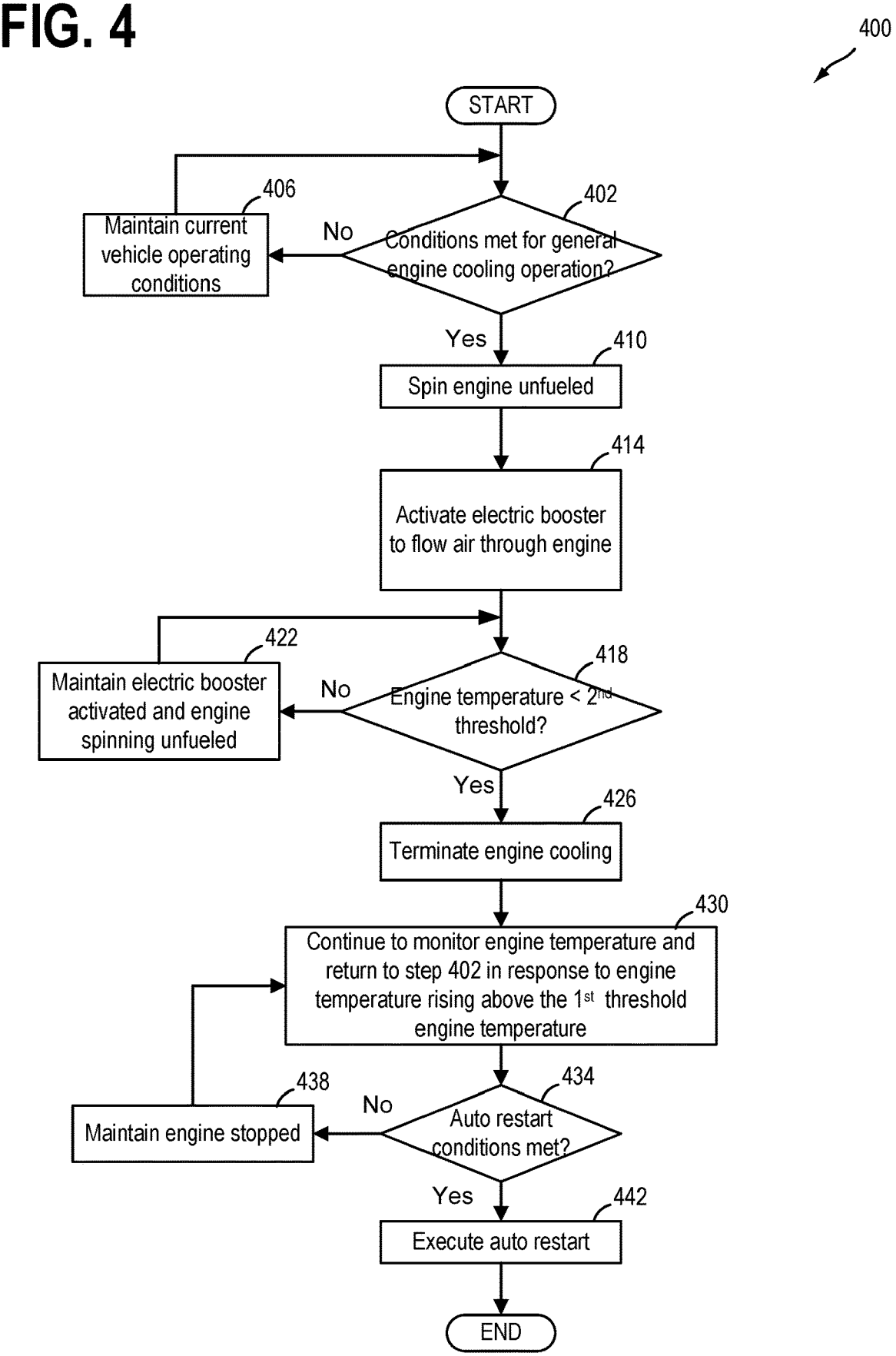
FIG. 4 illustrates an example method for conducting the general engine cooling operation of FIG. 3.
Figure 5:
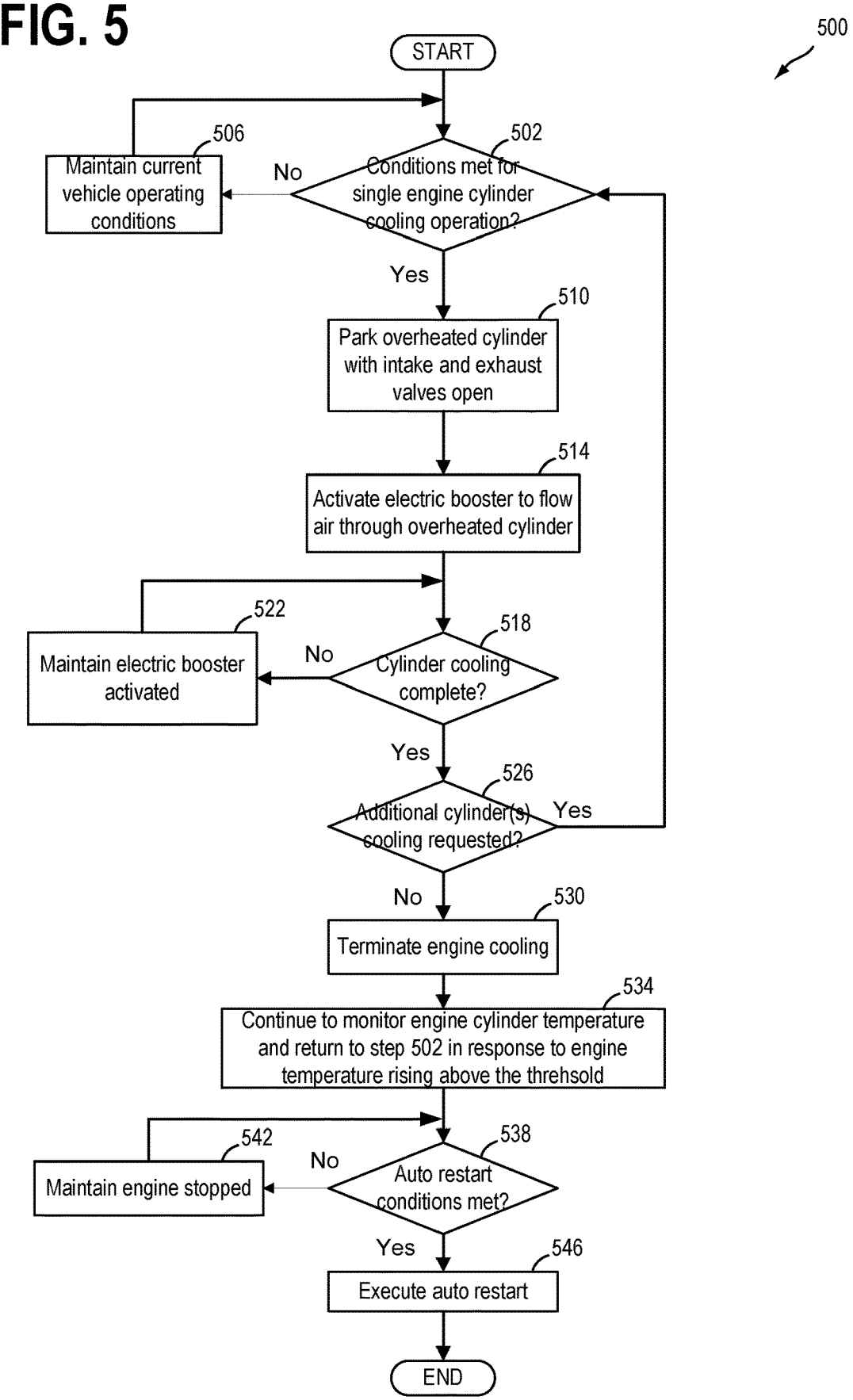
FIG. 5 illustrates an example method for conducting the single engine cylinder cooling operation of FIG. 3.
Figure 6:
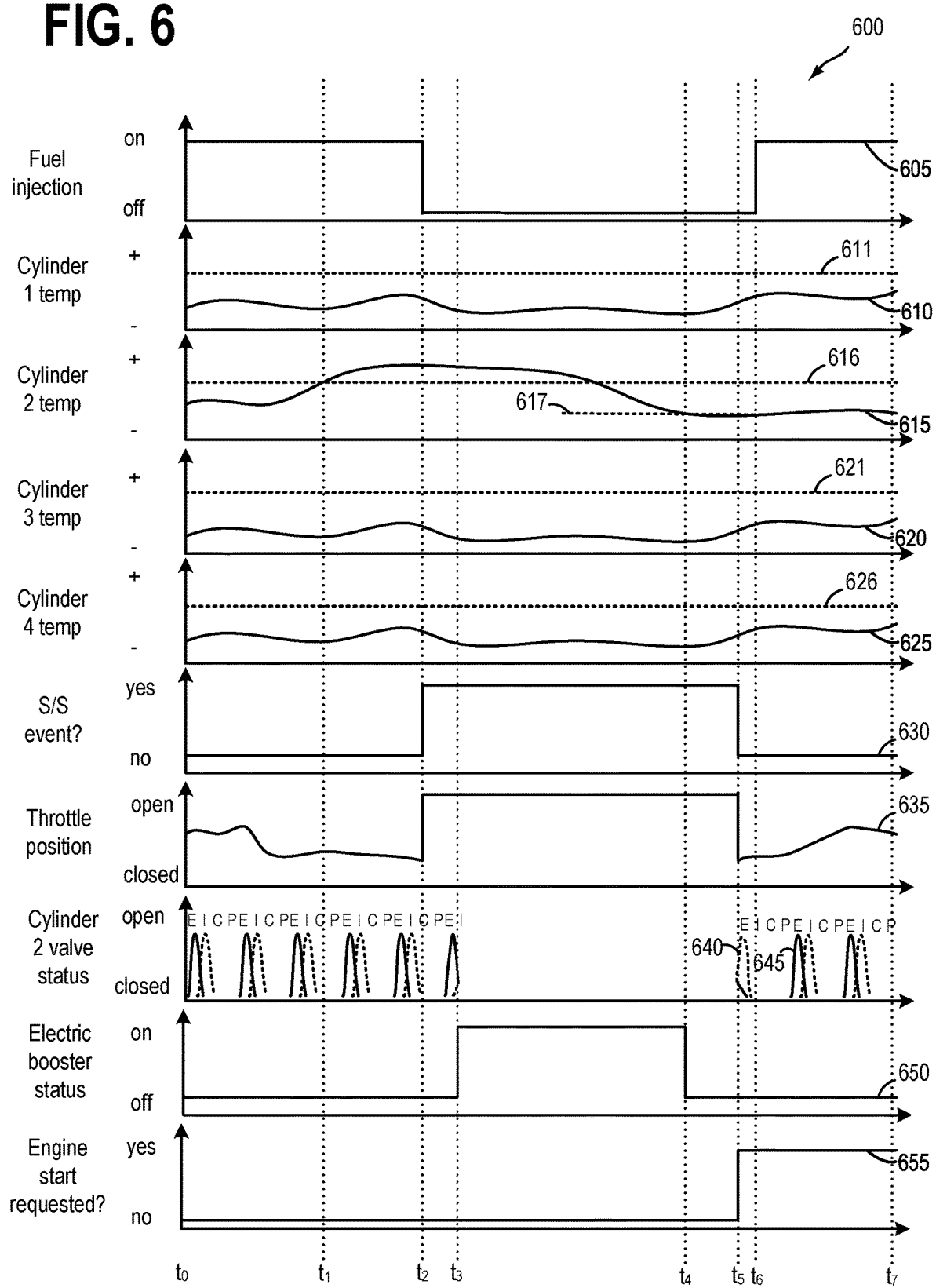
FIG. 6 depicts an example timeline for conducting the single engine cylinder cooling operation detailed at FIG. 5.
Figure 7:
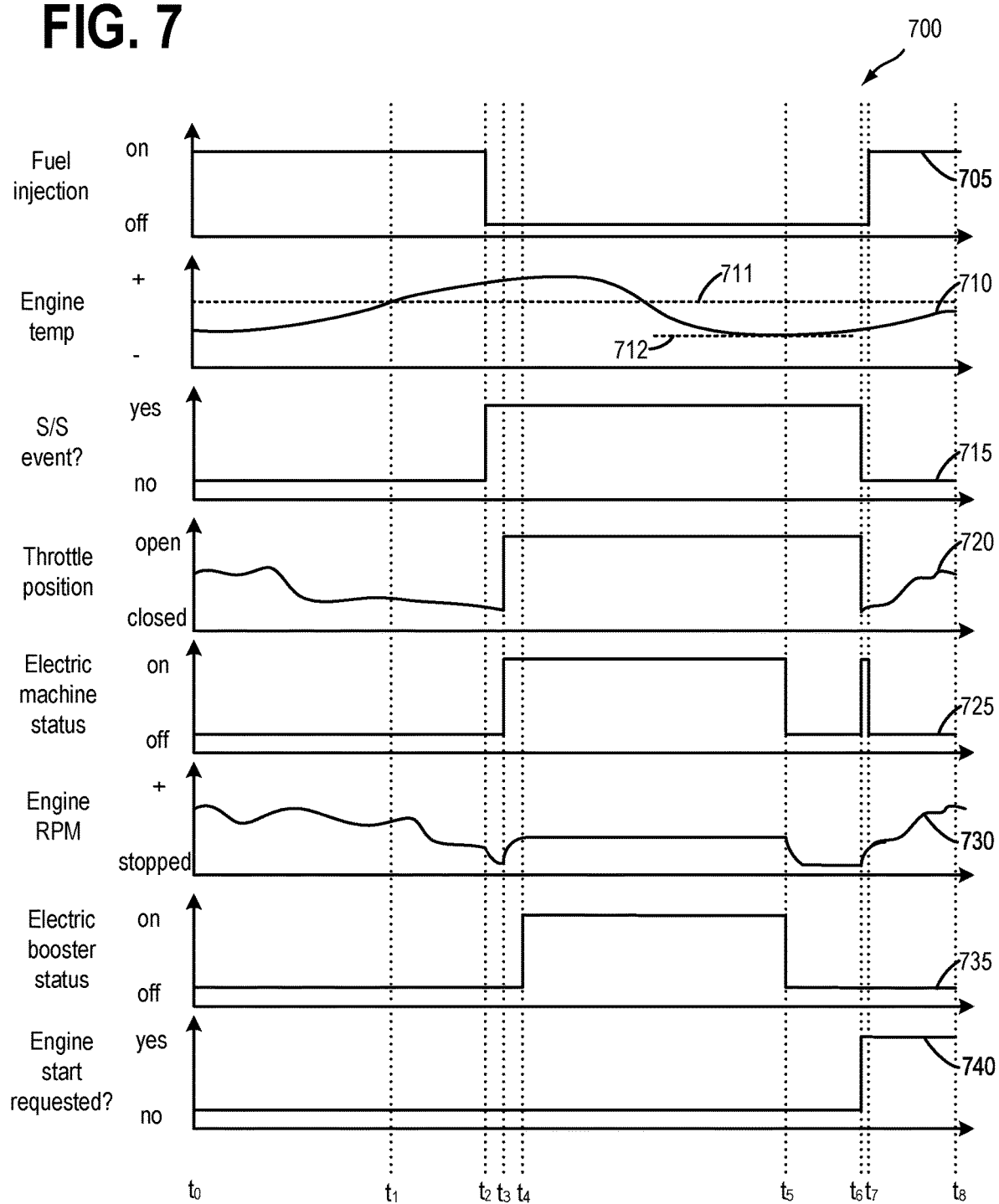
FIG. 7 depicts an example timeline for conducting the general engine cooling operation detailed at FIG. 4.

The following description relates to systems and methods for reducing temperature of an engine or single engine cylinder(s) under conditions where the engine or single engine cylinder(s) are indicated to be in a state of overheating. More specifically, the systems and methods apply to reducing engine or single cylinder(s) temperature at S/S events where the engine is not combusting air and fuel but where engine temperatures may continue to rise if mitigating actions are not taken to prevent such an occurrence. The systems and methods thus apply to vehicles equipped with S/S capabilities, such as the vehicle system depicted at FIG. 1. Furthermore, the systems and methods discussed herein relate to cooling the engine and/or cylinders via an electric booster, also referred to herein as an electric compressor or electric air compressor, positioned upstream of the engine in the engine system, as illustrated at FIG. 1. To conduct the single engine cylinder cooling operation, the engine may be controlled such that the cylinder selected for cooling may be positioned with its intake and exhaust valve at least partially open, so that routing air from the electric booster may flow through the selected cylinder, but may be prevented from flowing through remaining engine cylinders. Accordingly, FIG. 2 depicts an illustration of a cylinder equipped with TiVCT (twin independent variable cam timing), which may enable such a method. FIG. 3 depicts a method for determining whether to conduct a general engine cooling operation, or a single engine cylinder cooling operation, depending on whether the engine overheating condition is isolated to a single cylinder or cylinders, or whether the overheating condition is related to the engine system as a whole. Accordingly, FIG. 4 depicts an example method for conducting the general engine cooling operation, which may include rotating the engine unfueled and routing compressed air via the electric booster through the engine to cool it. Alternatively, FIG. 5 depicts an example method for conducting the single engine cooling operation, which as discussed includes routing compressed air through the cylinder selected for cooling, via the electric booster. FIG. 6 depicts an example timeline for conducting the single engine cylinder cooling operation, according to the method of FIG. 5, and FIG. 7 depicts an example timeline for conducting the general engine cooling operation, according to the method of FIG. 4.

Turning now to the figures, FIG. 1 shows a schematic view 101 of a vehicle system 102 with an example engine system 100 including an engine 10. The engine 10 includes an engine air intake system 162 and an engine exhaust system 163. In one example, the engine system 100 may be a diesel engine system. In another example, the engine system 100 may be a gasoline engine system. In the depicted embodiment, engine 10 is a boosted engine coupled to a turbocharger including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124. In some examples, air flow in the intake manifold may be sensed via a mass air flow (MAF) sensor 121. Temperature of ambient air entering the intake passage 42 may be estimated via an intake air temperature (IAT) sensor 51.

Engine 10 may include an engine coolant system 185 for engine temperature control, which may include various components such as radiator 186, one or more cooling fans 187, coolant pump 188, water pump 189, and coolant reservoir (or sump) 190. In one example, CAC 118 may be coupled to engine coolant system 185 wherein coolant from engine coolant system 185 may also be circulated through CAC 118.

Engine 10 may include one or more engine temperature sensor(s) 181. In one example, engine temperature sensor 181 may comprise an engine coolant temperature sensor wherein engine temperature is inferred from engine coolant temperature. In another example, engine temperature sensor 181 may additionally or alternatively comprise a cylinder head temperature (CHT) sensor, wherein the engine temperature is inferred from the cylinder head temperature. In still other examples, engine temperature sensor 181 may additionally or alternatively comprise one or more in-cylinder temperature sensor(s). For example, for a four cylinder engine, each of the four cylinders may include an in-cylinder temperature sensor, or any one of the four cylinders may include the in-cylinder temperature sensor.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled (where included), the sensors may estimate a temperature, pressure, humidity, and air-fuel ratio of the aircharge mixture including fresh air, recirculated compressed air, and exhaust residuals received at the compressor inlet. In some examples, engine 10 may include one or more knock sensor(s) 131 configured to sense undesired or unexpected pulsations resulting from engine detonation. In some examples, data acquired from the knock sensor(s) may be confined to particular timing windows, which may enable a determination of which cylinder of the engine is knocking. Such a determination may in some examples be used to infer whether or not a particular engine cylinder is overheating, for example.

A wastegate actuator 92 may be actuated to open wastegate 91 to dump at least some exhaust pressure from upstream of the turbine to a location downstream of the turbine via wastegate 91. By reducing exhaust pressure upstream of the turbine, turbine speed can be reduced, which in turn helps to reduce compressor surge. Wastegate 91 may be positioned in a wastegate passage 90. The methodology discussed herein utilizes a wastegate that is actuatable open and closed, however, it is herein recognized that in some examples, a spring-loaded wastegate may be included in the vehicle system.

To assist the turbocharger 15, an additional intake air compressor, herein also referred to as an electric booster 155 may be incorporated into the vehicle propulsion system. Electric booster 155 may be powered via an onboard energy storage device 151, which may comprise a battery, capacitor, supercapacitor, etc. The electric booster may include a compressor driven by an electric motor 182. A speed of operation of the electric booster may include adjusting a speed of operation of the electric motor, the electric motor operated via the on-board energy storage device 151.

Energy storage device 151 may periodically receive electrical energy from a power source 191 residing external to the vehicle (e.g., not part of the vehicle) as indicated by arrow 192. As a non-limiting example, vehicle system 102 may be configured as a plug-in hybrid electric vehicle (HEV), whereby electrical energy may be supplied to energy storage device 151 from power source 191 via an electrical energy transmission cable 193. During a recharging operation of energy storage device 151 from power source 191, electrical transmission cable 193 may electrically couple energy storage device 151 and power source 191. While the vehicle propulsion system is operated to propel the vehicle, electrical transmission cable 193 may disconnected between power source 191 and energy storage device 151. Control system 14 may identify and/or control the amount of electrical energy stored at the energy storage device, which may be referred to as the state of charge (SOC). As indicated, traction battery 58 may in some examples also obtain electrical energy from power source 191. Further, in some examples, traction battery 58 and energy storage device 151 may comprise the same energy storage device.

In other examples, electrical transmission cable 193 may be omitted, where electrical energy may be received wirelessly at energy storage device 151 from power source 191. For example, energy storage device 151 may receive electrical energy from power source 191 via one or more of electromagnetic induction, radio waves, and electromagnetic resonance. As such, it may be appreciated that any suitable approach may be used for recharging energy storage device 151 from a power source that does not comprise part of the vehicle.

In one example, electric booster 155 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 155 may be actuated off, or deactivated. More specifically, operational control of the electric booster 155 may be achieved based on command signals (e.g. duty cycle or pulse width signals) received from the vehicle controller (e.g. controller 12). For example, the controller may send a signal to an electric booster actuator 155b, which may actuate on the electric booster. In another example, the controller may send a signal to the electric booster actuator 155b, which may actuate off the electric booster. In one example the electric booster actuator may comprise an electric motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple electric booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 22.

In circumstances where the electric booster 155 is activated to provide boost more rapidly than if the turbocharger 15 were solely relied upon, it may be understood that electric booster bypass valve 161 may be commanded closed while electric booster 155 is activated. In this way, intake air may flow through turbocharger 15 and through electric booster 155. Once the turbocharger reaches the threshold speed, the electric booster 155 may be turned off, and the electric booster bypass valve 161 may be commanded open.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft position sensors 199 may be included in the vehicle propulsion system. Furthermore, crankshaft 174 may include crankshaft position sensor 197. In some examples, one or both of crankshaft position sensor 197 and/or camshaft position sensors 199 may be utilized to infer a position of one or more pistons coupled to the combustion chambers 30.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate then flows through emission control device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

In some examples, engine exhaust system 163 may further include a gasoline particulate filter (GPF) 164. GPF 164 may comprise a particulate filter, hydrocarbon trap, a catalyzed wash coat, or combination thereof. In some examples, during operation of engine 10, GPF 164 may be periodically regenerated by operating at least one cylinder of the engine within a particular air-fuel ratio to increase a temperature of GPF 164, such that retained hydrocarbons and soot particles may be oxidized.

In some examples, temperature sensor 166 may be positioned upstream from the inlet of GPF 217 and temperature sensor 167 may be positioned downstream of GPF 164. Temperature sensors 166 and 167 may be used to assess the temperature of GPF 164 for regeneration purposes, for example. Furthermore, pressure in the exhaust system may be assessed by pressure sensor 165. Pressure sensor 165 may be a differential pressure sensor positioned upstream (closer to exhaust manifold) and downstream (farther from exhaust manifold) of GPF 164, for example. Pressure sensor 165 may be used to determine pressure at the inlet of GPF 164 in order to assess operating conditions for air to be introduced to the inlet of GPF 164 for regeneration. Furthermore, in some examples, a soot sensor may be positioned downstream of GPF 164, to assess the level of soot that is released from GPF 164.

In some examples, exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 180 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

One or more sensors may be coupled to EGR passage 180 for providing details regarding the composition and condition of the EGR. For example, a temperature sensor 168 may be provided for determining a temperature of the EGR, a pressure sensor 169 may be provided for determining a pressure of the EGR, a humidity sensor (not shown) may be provided for determining a humidity or water content of the EGR, and an air-fuel ratio sensor (not shown) may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 128, an exhaust oxygen sensor (e.g. 126), an exhaust flow sensor, and exhaust pressure sensor 129 may be coupled to the main exhaust passage 104. The oxygen sensor may be linear oxygen sensors or UEGO (universal or wide-range exhaust gas oxygen), two-state oxygen sensors or EGO, HEGO (heated EGO), a $NO_x$, HC, or CO sensors.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust pressure sensor 129, compressor inlet temperature sensor 55, compressor inlet pressure sensor 56, ambient humidity sensor 57, IAT sensor 51, engine coolant temperature sensor (e.g. 181), etc. Other sensors such as additional pressure, temperature, air/fuel ratio, and composition sensors may be coupled to various locations in engine system 100. In addition, sensors coupled to the exterior of the vehicle system such as the rain sensor (windshield sensor) 130 may be used to estimate ambient humidity.

The actuators 18 may include, for example, electric booster bypass valve 161, throttle 20, electric booster actuator 155*b*, EGR valve 152, wastegate actuator 92, throttle 20, and fuel injector 66. The control system 14 may include a controller 12. The controller 12 may receive input data from the various sensors, process the input data, and trigger various actuators in response to the processed input data based on instruction or code programmed therein corresponding to one or more routines.

The controller 12 may be coupled to a wireless communication device 156 for direct communication of the vehicle 102 with a network cloud 160. Using the wireless communication 150 via the device 156, the vehicle 102 may retrieve data regarding current and/or upcoming ambient conditions (such as ambient humidity, temperature, pressure, etc.) from the network cloud 160. At completion of a drive cycle, the database 13 within the controller 12 may be updated with route information including driver behavioral data, engine operating conditions, date and time information, and traffic information. Furthermore, in some examples, controller may be in communication with a remote engine start receiver (or transceiver) that receives wireless signals from a key fob having a remote start button, the remote start button actuated by a vehicle operator from a location that is remote from the vehicle location. In other examples (not shown), a remote engine start may be initiated via a cellular telephone, or smartphone based system where a user's cellular telephone sends data to a server and the server communicates with the vehicle to start the engine.

Controller 12 may be communicatively coupled to other vehicles or infrastructures using appropriate communications technology, as is known in the art. For example, control system 14 may be coupled to other vehicles or infrastructures via wireless communication 150 which may comprise Wi-Fi, Bluetooth, a type of cellular service, a wireless data transfer protocol, and so on. Control system 14 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles and/or infrastructures can be either direct between vehicles/infrastructures, or can be multi-hop. In some examples, longer range communications (e.g. WiMax) may be used in place of, or in conjunction with, V2V, V2I2V, etc., to extend the coverage area by a few miles. In still other examples, vehicle control system 14 may be in wireless communication 150 with other vehicles or infrastructures via network cloud 160 and the internet.

Vehicle system 102 may also include an on-board navigation system 184 (for example, a Global Positioning System) that an operator of the vehicle may interact with. The navigation system 184 may include one or more location sensors for assisting in estimating vehicle speed, vehicle altitude, vehicle position/location, etc. This information may be used to infer engine operating parameters, such as local barometric pressure. As discussed above, control system 14 may further be configured to receive information via the internet or other communication networks. Information received from the GPS may be cross-referenced to information available via the internet to determine local weather conditions, local vehicle regulations, etc. In some examples, information from the GPS may enable vehicle location information, traffic information, etc., to be collected via the vehicle.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode, or a remote start event may trigger a return to an awake mode.

In some examples, vehicle 102 may be a hybrid vehicle with multiple sources of torque available to one or more vehicle wheels 171. In the example shown, vehicle 102 includes engine 10 and an electric machine 52. Electric machine 52 may be a motor or a motor/generator. Crankshaft 174 of engine 10 and electric machine 52 are connected via a transmission 54 to vehicle wheels 171 when one or more clutches 172 are engaged. In the depicted example, a first clutch is provided between crankshaft 174 and electric machine 52, and a second clutch is provided between electric machine 52 and transmission 54. Controller 12 may send a signal to an actuator of each clutch 172 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 171. Electric machine 52 may also be operated as a generator to provide electrical power to charge traction battery 58, for example during a braking operation. In some examples, traction battery 58 may comprise the same energy storage device as onboard energy storage device 151.

In some examples, a fuel economy gauge 194 may indicate fuel efficiency, to indicate whether fuel efficiency is degraded as a result of degradation in the vehicle system (e.g. stuck open wastegate).

Engine 10 may be configured with S/S feature 183 (also referred to herein as a S/S system) communicatively coupled to control system 14, wherein the control system 14 may automatically shut down (idle-stop) the internal combustion engine 10, without receiving operator input to shut down the engine, if selected idle-stop conditions are met. These may include, for example, torque demand being less than a threshold, engine speed less than a threshold engine speed (as monitored via, for example, engine speed sensor 132), vehicle speed below a threshold vehicle speed (e.g. 5 mph) the onboard energy storage device being sufficiently charged, no request being received for air-conditioning, etc. Likewise, the engine may be automatically restarted responsive to the torque demand being higher than the threshold, the battery requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions can be reduced.

Furthermore, in some examples, intake manifold 22 may be selectively fluidically coupled to an evaporative emissions system 178, the evaporative emissions system selectively fluidically coupled to a fuel system (not shown). More specifically, a canister purge valve 179 may fluidically couple the intake manifold to the evaporative emissions system. For example, the evaporative emissions system may include a fuel vapor storage canister that serves to capture and store fuel vapors from the fuel system, which may then be purged to the engine via commanding open the canister purge valve under select engine operating conditions.

FIG. 2 depicts an example embodiment of a combustion chamber or cylinder that may be included in engine 10 depicted in FIG. 1. Cylinder (i.e. combustion chamber) 30 may include combustion chamber walls 236 with piston 238 positioned therein. Piston 238 may include one or more piston rings 268. The one or more piston rings 268 may function to seal cylinder 30, to assist with piston heat transfer, and to regulate oil consumption, for example. Piston 238 may be coupled to crankshaft 174 so that reciprocating motion of the piston is translated into rotational motion of the crankshaft. Crankshaft 174 may be coupled to at least one drive wheel of the passenger vehicle via a transmission system. Further, a starter motor or electric machine (e.g. 52) may be coupled to crankshaft 174 via a flywheel to enable a starting operation of engine 10, and/or to rotate the engine in an unfueled mode.

Cylinder 30 can receive intake air via intake air passage 244 (e.g. 22), which may be one of a plurality of intake air passages coupled to cylinder 30. Intake air passage 244 may communicate with other cylinders of engine 10 in addition to cylinder 30. In some embodiments, one or more of the intake passages may include a boosting device such as a turbocharger or a supercharger. Exhaust passage 248 (e.g. 36) can receive exhaust gases from cylinder 30 as well as from other cylinders of engine 10.

Each cylinder of engine 10 may include one or more intake valves and one or more exhaust valves. For example, cylinder 30 is shown including at least one intake poppet valve 256 and at least one exhaust poppet valve 250 located at an upper region of cylinder 30. In some embodiments, each cylinder of engine 10, including cylinder 30, may include at least two intake poppet valves and at least two exhaust poppet valves located at an upper region of the cylinder.

Intake valve 256 may be controlled by a controller via actuator 252. Similarly, exhaust valve 250 may be controlled by a controller via actuator 254. During some conditions, the controller may vary the signals provided to actuators 252 and 254 to control the opening and closing of the respective intake and exhaust valves. The position of intake valve 256 and exhaust valve 250 may be determined by respective position sensors 199a and 199b, respectively. The valve actuators may be of the electric valve actuation type or cam actuation type, or a combination thereof. The intake and exhaust valve timing may be controlled concurrently or any of a possibility of variable intake cam timing, variable exhaust cam timing, twin independent variable cam timing (TiVCT), or fixed cam timing may be used. Each cam actuation system may include one or more cams (e.g. actuator 252 and/or 254) and may utilize one or more of cam profile switching (CPS), variable cam timing (VCT), variable valve timing (VVT) and/or variable valve lift (VVL) systems that may be operated by a controller to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Shown for illustrative purposes at FIG. 2 is an example of TiVCT. Specifically, an intake camshaft 281 and an exhaust camshaft 282 are illustrated. It may be understood that such a configuration may enable the ability to advance or retard timing of both the intake camshaft 281 and the exhaust camshaft 282 independently. Such an ability may allow for improved power and torque, particularly at lower engine speed (engine RPM), as well as improved fuel economy and reduced emissions. Such an ability may further enable precise control over intake and exhaust valve position, which may include in some examples positioning a particular cylinder with intake and exhaust valves both at least partially open.

In an example, a first oil pressure-controlled actuator 283 under control of the controller may regulate rotation of intake camshaft 281, and a second oil pressure-controlled actuator 284 may regulate rotation of second camshaft 282. In this way the first and second oil pressure-controlled actuators may control the camshafts to advance or retard engine timing based on operating conditions. For example, the controller may utilize crankshaft position sensor 197 and position sensor(s) 199*a* and 199*b* (e.g. 199) to determine engine timing.

While the example depicted herein at FIG. 2 illustrates the actuators (e.g. 283 and 284) of the camshafts as oil pressure-controlled, there may be some examples where instead of oil pressure driven cam phasing, cam torque actuation (CTA) may be employed, which may utilize existing torsional energy in the valve train to rotate the camshaft(s), as is commonly understood in the art.

Furthermore, it may be understood that in examples where the vehicle includes TiVCT, an EGR valve (e.g. 152) and EGR passage 180 may not be included in the vehicle system, as retarding exhaust cam timing may achieve a similar result as recirculating exhaust gases.

Cylinder 30 can have a compression ratio, which is the ratio of volumes within the cylinder between when piston 238 is at bottom dead center (BDC) and at top dead center (TDC). It may be understood that, as discussed herein, BDC may comprise a position of piston 238 being in closest proximity to crankshaft 174, whereas TDC may comprise a position of piston 238 being at a position farthest from crankshaft 174. Furthermore, it may be understood that, as discussed herein, TDC may be understood to be 180° from BDC. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 292 for initiating combustion. An ignition system (not shown) can provide an ignition spark to cylinder 30 via spark plug 292 in response to a spark advance signal from a controller, under select operating modes. However, in some embodiments, spark plug 292 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 may include two fuel injectors (e.g., a port fuel injector and a direct fuel injector). Fuel injector 66 is shown coupled directly to cylinder 30 for injecting fuel directly therein in proportion to a pulse width of a signal received from a controller via an electronic driver. In this manner, fuel injector 66 provides what is known as direct injection (hereafter referred to as "DI") of fuel into cylinder 30. While FIG. 2 shows injector 66 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 66 from a high pressure fuel system including a fuel tank, fuel pumps, a fuel rail, etc. Alternatively, fuel may be delivered by a single stage fuel pump at lower pressure, in which case the timing of the direct fuel injection may be more limited during the compression stroke than if a high pressure fuel system is used.

Fuel may be delivered to the cylinder during a single cycle of the cylinder. Discussed herein, a single engine cycle includes an exhaust stroke, an intake stroke, a compression stroke, and a power stroke. It may be further understood that, when a piston is within a threshold (e.g. within) 5° of TDC between the exhaust stroke and the intake stroke, both the intake valve and the exhaust valve may be at least partially open. Directly injected fuel may be delivered during an intake stroke as well as partly during a previous exhaust stroke. Further, the direct injected fuel may be delivered as a single injection or as multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

A positive crackcase ventilation (PCV) system, may be coupled to the engine intake so that gasses in the crankcase 262 may be vented in a controlled manner from the crankcase. Engine 10 may include a crankcase ventilation tube 258, and a PCV line 260 in order to vent gasses out of the crankcase 262 and into intake manifold. In some examples PCV line 260 may include PCV valve 264, which may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

As described above, FIG. 2 shows only one cylinder of a multi-cylinder engine. As such each cylinder may similarly include its own set of intake/exhaust valves, fuel injector(s), spark plugs, piston rings, etc.

Thus, discussed herein, the systems described above with regard to FIGS. 1-2 may enable a system for a hybrid vehicle comprising and engine, the engine including an intake and an exhaust, and a plurality of engine cylinders, each cylinder including intake and exhaust valves. An electric air compressor, or electric booster, may be coupled to the intake at a position upstream of a charge air cooler, where the charge air cooler is upstream of an intake throttle. The system may include a first actuator configured to control rotation of a first camshaft mechanically coupled to the intake valves of the plurality of engine cylinders, and may further include a second actuator configured to control rotation of a second camshaft mechanically coupled to the exhaust valves of the plurality of engine cylinders. The system may further include a start/stop system configured to automatically stop the engine from combusting air and fuel in response to a set of predetermined conditions being met.

The system may further include a controller, the controller storing instructions in non-transitory memory that, when executed, cause the controller to activate the electric air compressor at a start/stop event where the engine is stopped from combusting air and fuel, to flow cool air through the single cylinder of the engine. Such action may be conducted under conditions where a first temperature of the single cylinder is above a first threshold cylinder temperature, but where a second temperature of the engine is below a first threshold engine temperature. In such an example, activating the electric air compressor to flow cool air through the single cylinder may further comprise commanding open the throttle to a fully open position, and controlling the first actuator and the second actuator to position an intake valve and an exhaust valve of the single cylinder to at least partially open configurations.

The system may further comprise a wireless communication device, and an on-board navigation system. Accordingly, the controller may store further instructions to retrieve information related to a predicted duration of the start/stop event via the wireless communication device and/or the on-board navigation system. The controller may activate the electric air compressor to flow cool air through the single cylinder at the start/stop event responsive to the start/stop event being predicted to be of a duration greater than an amount of time predicted to reduce the first temperature of the single cylinder to a desired temperature.

The system may further include a turbine positioned in the exhaust, the turbine mechanically coupled to a mechanically-driven compressor positioned upstream of the electric air compressor. The system may further include a wastegate passage including an actuatable wastegate, the wastegate passage configured to route fluid flow around the turbine under conditions where the actuatable wastegate is open. Thus, the controller may store further instructions to command open the wastegate at the start/stop event and just prior (e.g. within 5 seconds or less) to activating the electric air compressor.

The system may further comprise a motor, the motor configured to rotate the engine. In such an example, the controller may store further instructions to activate the electric air compressor and rotate the engine unfueled under conditions where the second temperature of the engine is greater than the first threshold engine temperature, to cool the plurality of engine cylinders, rather than flowing cool air through the single cylinder.

Turning now to FIG. 3, a high level flowchart of an example method 300 for determining whether an indicated engine overheating condition includes a general engine overheating condition, where overheating is not confined to a single cylinder, or where the indicated engine overheating condition includes a single cylinder overheating. The method includes, responsive to determining a general engine overheating condition, scheduling a general engine cooling operating for the next S/S event, and responsive to a single cylinder overheating condition, scheduling a single cylinder cooling operation for the next S/S event. Such methods are described in detail with regard to FIGS. 4-5, respectively. Thus, method 300 enables engine cooling to be provided when other methods of engine cooling are insufficient to maintain engine temperatures within a desired range. Consequently, employing method 300 may reduce the probability and/or extent of engine degradation due to conditions of overheating. Method 300 will be described with reference to the systems described herein and shown in FIGS. 1-2, though it will be appreciated that similar methods may be applied to other systems without departing from the scope of this disclosure. Instructions for carrying out method 300 and the rest of the methods included herein may be executed by a control system, such as control system 14 of FIG. 1, based on instructions stored in non-transitory memory, and in conjunction with signals received from sensors of the engine system, such as temperature sensors, pressure sensors, and other sensors described in FIGS. 1-2. The controller may employ actuators such as electric booster actuator (e.g. 155b), throttle (e.g. 20), wastegate actuator (e.g. 92), EGR valve (e.g. 152), etc., according to the methods described herein.

Method 300 begins at 302 and may include evaluating current vehicle and engine operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

At 302, estimating, measuring, and/or inferring engine temperature may be via the one or more engine temperature sensor(s) (e.g. 181), discussed above. For example, general engine overheating conditions may be measured or inferred from an engine coolant temperature sensor and/or one or more CHT sensor(s), and single cylinder overheating conditions may be estimated, measured, or inferred via the one or more CHT sensor(s) and/or in-cylinder temperature sensor(s), where included.

In another example, it may be inferred as to whether a single engine cylinder (or in some examples more than one single engine cylinder) is overheating based on an onboard cylinder power balance test. Specifically, in some examples, carbon buildup in any particular engine cylinder may result in increased compression in that cylinder, which may thus be indicative of that cylinder overheating. More specifically, engine speed and crankshaft angle may be monitored (e.g. via engine speed sensor 132 and crankshaft position sensor 197, respectively), and a determination of a sudden or unexpected acceleration in engine speed may be correlated with a particular crankshaft position (e.g. crank angle) at which the acceleration occurs. Such data may thus enable a determination of which particular cylinder is producing increased torque (e.g. increased over that expected or predicted), the increased torque potentially the result of a higher compression ratio due to carbon deposits. Such an indication may be indicative of that particular cylinder overheating, as discussed.

In another example, it may be additionally or alternatively inferred as to whether a single engine cylinder (or in some examples more than one single engine cylinder) is overheating based on data acquired from one or more knock sensor(s) (e.g. 131), where such data may be acquired within specific timing windows that may enable a determination as to which particular cylinder is knocking, which may enable it to be inferred as to whether such a particular cylinder is overheating. For example, the timing windows may be specific to a period of time of combustion for each particular engine cylinder. More specifically, for a four cylinder engine there may be four timing windows, each corresponding to combustion events for each particular cylinder.

Accordingly, proceeding to step 306, method 300 may include indicating whether an engine overheating condition is identified. The engine overheating condition may comprise general engine overheating, or may comprise single engine cylinder (one or more single engine cylinders) overheating. An engine overheating condition may comprise engine temperature above a threshold engine temperature, or a single cylinder or cylinder(s) above a threshold cylinder temperature. As will be discussed in detail below, the threshold engine temperature may be referred to as a first threshold engine temperature, and the threshold cylinder temperature may be referred to as a first threshold cylinder temperature.

If, at 306, an engine overheating condition is not identified, method 300 may proceed to 310, and may include maintaining current vehicle operating conditions. Specifically, if the vehicle is being propelled via the engine, then engine operation may be maintained according to driver demand. In another example, if the vehicle is being propelled at least in part via the electric machine (e.g. 52), such conditions may be maintained. Method 300 may then end. It may be understood that under conditions where engine overheating is not identified, engine temperature may be continued to be monitored throughout the current drive cycle, such that engine overheating may be identified at any point in the current drive cycle.

Returning to step 306, if an engine overheating condition is identified, method 300 may proceed to 314. At 314, method 300 may include indicating whether a single cylinder overheating condition is identified. If a single engine cylinder overheating condition is not identified, then method 300 may proceed to 318, where a general engine cooling operation for the next S/S event may be scheduled. Scheduling the general engine cooling operation may include setting a flag at the controller, such that responsive to conditions being met for a S/S event during the current drive cycle, the general engine cooling operation may commence. Furthermore, at 318, mitigating actions may be taken to reduce the extent of the general engine overheating condition. Examples of mitigating actions may include activating one or more cooling fan(s) (e.g. 187) to direct cool air toward the engine in an attempt to lower the temperature. Other examples of mitigating actions may include stopping fuel injection to one engine cylinder while the engine is continued to rotate via the rest of the engine cylinders still receiving fuel, then resuming fueling and stopping fuel injection to another engine cylinder, and so on, in a round robin style fashion. More specifically, in an example where the engine comprises a four cylinder engine, a first cylinder may first be cut off from fueling, then the second cylinder may be cut off while fueling to the first cylinder is resumed. Next, the third cylinder may be cut off from fueling while fueling to the second cylinder is resumed, and so on. It may be understood that in such an example, each cylinder may be cut off from fueling for a predetermined duration, prior to resuming fueling. It may be further understood that, in such an example, when a single cylinder is cut off from fueling, the intake and exhaust valve(s) may continue to operate, resulting in air flow through the cylinder cut off from fueling, which may serve to reduce the extent of overheating of the engine in some examples.

With mitigating actions undertaken and the general engine cooling operation scheduled at 318, method 300 may proceed to 322. At 322, method 300 may include conducting the general engine cooling operation according to the methodology depicted at FIG. 5. Method 300 may then end.

Returning to 314, in response to a single cylinder overheating condition being identified, method 300 may proceed to 326. At 326, method 300 may include scheduling a single engine cylinder cooling operation for the next S/S event. Scheduling the single engine cylinder cooling operation may include setting a flag at the controller, such that responsive to conditions being met for an S/S event during the current drive cycle, the single engine cylinder cooling operation may commence. Furthermore, at 326, mitigating actions may be taken to reduce the extent of the single engine cylinder overheating condition. Examples of mitigating actions may include activating one or more cooling fan(s) (e.g. 187) to direct cool air toward the engine in an attempt to lower the temperature of the overheating cylinder. Other examples of mitigating actions may include stopping fuel injection to the single engine cylinder that is identified to be overheating, similar to that discussed at 318 of method 300. Specifically, the single engine cylinder may be cut off from fueling for a predetermined duration, where after predetermined duration elapses, then fueling may be resumed. It may be understood that while fueling is cut off from the single engine cylinder, intake and exhaust valve(s) may continue to operate, thus resulting in air being routed through the single engine cylinder, which may assist in cooling the cylinder.

With the single engine cylinder cooling operation scheduled, and in response to mitigating actions being undertaken, method 300 may proceed to 330. At 330, method 300 may include conducting the single engine cylinder cooling operation according to FIG. 6. Method 300 may then end.

Returning to step 314, it is herein recognized that in some examples, more than one single cylinder may be overheating, but the condition may not be such that a general engine cooling operation is warranted. Consider for example, an eight cylinder engine where two engine cylinders are overheating. In such a circumstance, it may be desirable to, in some examples conduct a general engine cooling operation, whereas in other examples it may be desirable to conduct the single engine cylinder cooling operation, in a sequential fashion, which will be discussed in greater detail below. More specifically, as will be elaborated below, both the single engine cylinder cooling operation and the general engine cooling operation may utilize energy derived from the onboard energy storage device (e.g. 151) and/or traction battery (e.g. 58). As discussed, in some examples the onboard energy storage device and traction battery may comprise the same onboard energy storage device, and thus herein "onboard energy storage device" will be referred to. The general engine cooling operation may utilize a greater amount of energy from the onboard energy storage device, as compared to the single engine cylinder cooling operation. Thus, in some examples where more than one single engine cylinder is indicated as overheating, the controller may determine a state of charge of the onboard energy storage device, to indicate whether it is desirable to conduct the general engine cooling strategy, or sequentially conduct the single engine cooling strategy. More specifically, under conditions where more than one single engine cylinder is indicated to be overheating, if SOC is indicated to be below a threshold SOC, then the single engine cooling operation methodology may be conducted, in a sequential fashion, which may reduce an amount of energy utilized via the onboard energy storage device. Alternatively, if the SOC is indicated to be greater than the threshold SOC, then the general engine cooling operation may be conducted. The threshold SOC may be a function of how many engine cylinders are indicated to be overheating, and may further be a function of the extent to which the engine cylinders are overheating (e.g. the extent to which each cylinder is above the first threshold cylinder temperature). For example, if three engine cylinders out of eight are overheating, and the SOC is greater than the threshold, then it may be desirable to conduct the general engine cooling strategy to reduce complexity of performing a sequential single engine cooling operation. However, if the SOC is below the threshold, then the single engine cooling operation may be conducted in sequential fashion.

Turning now to FIG. 4, a high level flowchart of an example method 400 for conducting a general engine cooling operation in response to the general cooling operation being scheduled according to step 318 of method 300, is shown. More specifically, conducting the general cooling operation at FIG. 4 may include spinning the engine of the vehicle unfueled at a S/S event, and activating an electric booster positioned upstream of the engine, in the intake of the engine. In this way, under conditions where there is potential for engine overheating to be exacerbated at a S/S event, where temperatures under a hood of the vehicle may continue to rise, such potential exacerbation of engine overheating may be reduced, and in some cases avoided altogether.

Method 400 will be described with reference to the systems described herein and shown in FIGS. 1-2, though it will be appreciated that similar methods may be applied to other systems without departing from the scope of this disclosure. Instructions for carrying out method 400 and the rest of the methods included herein may be executed by a control system, such as control system 14 of FIG. 1, based on instructions stored in non-transitory memory, and in conjunction with signals received from sensors of the engine system, such as temperature sensors, pressure sensors, and other sensors described in FIGS. 1-2. The controller may employ actuators such as electric booster actuator (e.g. 155b), throttle (e.g. 20), wastegate actuator (e.g. 92), EGR valve (e.g. 152) (where included), etc., according to the methods described herein.

At 402, method 400 may include indicating whether conditions are met for conducting the general engine cooling operation. Conditions being met at 402 may comprise a S/S event, for example, occurring in the same drive cycle as the drive cycle where engine overheating was indicated. Conditions being met at 402 may further include an indication that the temperature of the engine still constitutes an overheated engine condition. In other words, as discussed above at step 318 of method 300, mitigating actions may be undertaken in an attempt to reduce engine temperatures prior to the S/S event. If such mitigating actions are successful in reducing engine temperature such that the overheated engine condition is no longer indicated, then conditions may not be met for conducting the general engine cooling operation. In other words, if engine temperatures have been sufficiently reduced during the drive cycle, then energy may be saved by avoiding conducting the general engine cooling operation.

If, at 402, conditions are not indicated to be met for conducting the general engine cooling operation, method 400 may proceed to 406. At 406, method 400 may include maintaining current vehicle operating conditions. For example, the engine may be maintained off for the S/S event. However, engine temperature may be continued to be monitored at 406, and in the event that engine temperature rises to a point where the engine overheating condition is indicated, then conditions may be indicated to be met for conducting the general engine cooling operation.

In response to conditions being met for conducting the general engine cooling operation, method 400 may proceed to 410. At 410, method 400 may include spinning the engine unfueled. Spinning the engine unfueled may include the controller commanding the electric machine (e.g. 58), or a starter motor, to rotate the engine, while fueling is not provided. The engine may be controlled to be spun unfueled in the forward, or default direction, where the forward or default direction comprises a direction of rotation that is the same as when the engine is combusting air and fuel. The engine may be spun at a predetermined speed, or may be controlled to a speed that is dependent on the extent of engine overheating. The predetermined speed may comprise a speed at which the rotating the engine unfueled does not adversely impact the cooling operation. In other words, the speed may be controlled to minimize heat generated via spinning the engine unfueled, while enabling a maximum amount of air flow through the engine, for the given speed.

While not explicitly illustrated, several other actions may be conducted at step 410. Specifically, the intake throttle (e.g. 20) may be commanded via the controller to a fully open position, the EGR valve (e.g. 152) (where included) may be commanded via the controller to a fully closed position, and the canister purge valve (e.g. 179) may be commanded via the controller to a fully closed position. Still further, where included, a wastegate, or wastegate valve (e.g. 91) may be commanded to a fully open position in some examples. By commanding open the wastegate, air routed through the engine (discussed in detail below) may be subjected to less resistance, as compared to when the wastegate is in a fully closed configuration. More specifically, with the wastegate open, air flow may be routed around the more restrictive turbine (e.g. 116), thus encouraging greater air flow through the engine. In a case where the wastegate comprises a spring-loaded wastegate, the wastegate may be maintained closed during the operation, which may not substantially affect the cooling operation as compared to a situation where the wastegate is able to be commanded open. In some examples, opening the wastegate and/or throttle may occur just prior (e.g. within less than 30 seconds) to spinning the engine unfueled, for example.

Proceeding to 414, method 400 may include activating the electric booster (e.g. 155) to direct air through the CAC, and through the engine. With the engine being spun unfueled, the cool air directed through the engine may serve to cool each of the engine cylinders, as each of the engine cylinders valves (intake and exhaust valves) open and close as the engine proceeds through a number of engine cycles. The electric booster may be activated at a predetermined speed, or predetermined power level. In some examples, the electric booster may be controlled to a speed and/or power level that is a function of engine temperature. For example, as engine temperature increases, the electric booster may be controlled to a higher speed and/or power level, to cool the engine.

With the electric booster activated at 414, method 400 may proceed to 418. At 418, method 400 may include continuing to monitor engine temperature, and responsive to engine temperature decreasing below a threshold engine temperature, the cooling operation may be terminated. More specifically, as discussed above, a temperature at which an engine overheating condition is indicated may comprise a first threshold engine temperature. Accordingly, at 418, the threshold engine temperature at which the cooling operation may be terminated may comprise a second threshold engine temperature. The second threshold engine temperature may be lower (cooler) than the first threshold engine temperature. In other words, if the cooling operation simply reduced the engine temperature to the first threshold temperature, then the potential for engine overheating may be highly likely to occur in a short time frame. However, by reducing engine temperature to the second threshold, below the first threshold, engine temperature may be maintained below the first threshold temperature for a greater duration and potentially for the rest of the drive cycle in some examples.

If, at 418, engine temperature is not indicated to be decreased to or below the second threshold engine temperature, method 400 may proceed to 422. At 422, method 400 may include maintaining the electric booster activated and the engine may be continued to be rotated unfueled.

In response to engine temperature decreasing to or below the second threshold engine temperature, method 400 may proceed to 426. At 426, method 400 may include terminating the general engine cooling operation. More specifically, terminating the general engine cooling operation may include the controller sending a signal to the electric booster, actuating it off. Furthermore, the controller may send a signal to the electric machine or motor, commanding the electric machine or motor to stop rotating the engine unfueled, at which point the engine may spin to rest. Furthermore, terminating the engine cooling operation may include the controller sending a signal to the wastegate, actuating it to a fully closed position, provided it was commanded open for the general engine cooling operation. Still further, in some examples if a threshold duration has elapsed where the engine temperature has not reached the second threshold engine temperature, or if battery SOC drops below a predetermined value, engine cooling may be terminated.

Proceeding to 430, method 400 may include continuing to monitor engine temperature for the duration of the S/S event. In the event that engine temperature rises to the first threshold engine temperature, then method 400 may include returning to step 402, where the general cooling operation may again be conducted in order to reduce engine temperature to the second threshold engine temperature, provided conditions are met for doing so.

Continuing to 434, method 400 may include indicating whether conditions are met for automatically restarting the engine to combust air and fuel. More specifically, a vehicle operator may step down on an accelerator pedal, requesting wheel torque. A requested wheel torque greater than a threshold wheel torque, or an accelerator pedal position greater than a threshold accelerator pedal position, may indicate a request to automatically restart the engine. If, at 434, auto restart conditions are not indicated to be met, method 400 may proceed to 438, and may include maintaining the engine stopped. In other words, current vehicle and engine operating conditions may be maintained and temperature of the engine may be continued to be monitored.

Alternatively, responsive to the auto restart conditions being indicated to be met, method 400 may proceed to 442. At 442, method 400 may include executing the auto restart. Restarting the engine may include the controller commanding a starter motor or electric machine to crank the engine until a threshold engine start speed is reached, and then providing fueling and spark in order for the engine to combust air and fuel. In one example, the engine may be fueled to provide a defined engine speed profile and a target engine torque. Method 400 may then end.

While not explicitly illustrated, it may be understood that there may be circumstances where the general engine cooling operation is started, but where an engine restart is requested prior to the engine being cooled to the second threshold engine temperature. Such a circumstance may in some examples be unavoidable, however it may be desirable to reduce such occurrences as much as possible, as when such a circumstance occurs, energy may be wasted in conducting a portion of the cooling operation, but where engine temperature is not reduced to the second threshold engine temperature. Such wasted energy usage may negatively impact fuel economy, for example.

To avoid such occurrences, in some examples, conditions being met at 402 for conducting the general engine cooling operation may include an indication that a particular S/S event is likely or predicted to be of a duration greater than an expected duration of the general engine cooling operation. For example, a duration of the general cooling operation may be a function of engine temperature, ambient temperature, mass air flow through the engine summed over the previous drive cycle, etc. As one example, a lookup table may be stored at the controller, which may be queried upon a S/S event where a general engine cooling operation is scheduled in order to obtain an estimate of the duration of time expected to conduct the general engine cooling operation. Furthermore, as discussed above, route information regarding drive cycles may be recorded at the controller, which may constitute learned route information. Accordingly, based on learned routes, a duration of a particular S/S event may be determined. Such a determination may be in conjunction with a GPS (e.g. 184), for example. Furthermore, such a determination may involve traffic information, acquired wirelessly via the controller, in some examples in conjunction with the GPS. In this way, it may be predicted/estimated how long a particular S/S event may last. Equipped with such information, the vehicle controller may make a determination as to whether to conduct the general engine cooling operation. More specifically, if the general engine cooling operation is expected to take a duration longer than the predicted or learned stop duration, then the cooling operation may not commence, which may avoid the undesired use of energy. Alternatively, if the general cooling operation is expected to take a duration less than the predicted or learned stop duration, then the cooling operation may commence. In other words, conditions may be met for conducting the general engine cooling operation in such an example.

While the above-description is directed towards the general engine cooling operation, it may be understood that such description applies equally to the single engine cylinder cooling operation, discussed in further detail below.

Turning now to FIG. 5, a high level flowchart of an example method 500 for conducting a single engine cylinder cooling operation in response to the single engine cylinder cooling operation being scheduled according to step 326 of method 300, is shown. More specifically, conducting the single engine cylinder cooling operation at FIG. 5 may include parking the cylinder that is indicated to be overheating with its intake and exhaust valves at least partially open, and then flowing air through the cylinder via activation of an electric booster (e.g. 155). In this way, a single engine cylinder that is indicated to be overheated may effectively be cooled during a S/S event, where if such action was not otherwise taken, the cylinder temperature may continue to rise, which may contribute to undesired engine degradation.

Method 500 will be described with reference to the systems described herein and shown in FIGS. 1-2, though it will be appreciated that similar methods may be applied to other systems without departing from the scope of this disclosure. Instructions for carrying out method 500 and the rest of the methods included herein may be executed by a control system, such as control system 14 of FIG. 1, based on instructions stored in non-transitory memory, and in conjunction with signals received from sensors of the engine system, such as temperature sensors, pressure sensors, and other sensors described in FIGS. 1-2. The controller may employ actuators such as electric booster actuator (e.g. 155*b*), throttle (e.g. 20), wastegate actuator (e.g. 92), EGR valve (e.g. 152) (if included), first oil pressure-controlled actuator (e.g. 283), second oil pressure-controlled actuator (e.g. 284), etc., according to the methods described herein.

Method 500 begins at 502, and may include indicating whether conditions are met for conducting the single engine cylinder cooling operation. Conditions being met at 502 may include a S/S event, occurring in the same drive cycle as the drive cycle where the single cylinder overheating condition was indicated (see step 314 at FIG. 3). Conditions being met at 502 may further include an indication that the temperature of the single cylinder (or cylinders) are still in an overheated condition. In other words, even though mitigating actions may be undertaken (see step 326 of method 300) to reduce the overheating condition of the single cylinder or cylinders, the mitigating actions may in some examples not be sufficient to reduce temperatures of the single cylinder or cylinders such that the overheated condition is no longer indicated. More specifically, as discussed above, a single cylinder overheating condition may comprise the single cylinder temperature above a first threshold cylinder temperature. Thus, if the temperature of the cylinder or cylinders are above the first threshold cylinder temperature, then conditions may be indicated to be met for conducting the single cylinder cooling operation.

In still other examples, as referred to above, conditions being met at 502 may include an indication that the particular S/S event is likely or predicted to be of a duration greater than an expected duration of the single engine cylinder cooling operation. The duration of the single cylinder cooling operation may be a function of engine temperature, ambient temperature, mass air flow through the engine summed over the previous drive cycle, etc. A lookup table stored at the controller may include an estimate of a duration of time expected to complete the single cylinder cooling operation, for example. Furthermore, route information regarding drive cycles may be stored at the controller, constituting learned route information. Based on the learned routes, a duration of particular S/S events may be determined. Such a determination may be in conjunction with a GPS, and may involve traffic information, acquired wirelessly via the controller, in some examples. In this way, it may be predicted/estimated how long a particular S/S event may last. Equipped with such information, the vehicle controller may make a determination as to whether to conduct the single engine cylinder cooling operation. More specifically, if the single engine cylinder cooling operation is predicted to take a duration longer than the predicted or learned stop duration, then the cooling operation may not commence, which may avoid the undesired use of energy. Such an indication may be particularly useful in examples where more than one cylinder is scheduled for the single engine cylinder cooling operation. Alternatively, if the single engine cylinder cooling operation is expected to take a duration less than the predicted or learned stop duration, then the cooling operation may commence.

Discussed herein, conducting the "single engine cylinder cooling operation" may involve one cylinder being cooled, or may involve more than one cylinder being cooled, where when the cooling operation involves more than one cylinder being cooled, the cylinders are cooled in sequential fashion, where only one cylinder is cooled at a time. Thus, the term "single engine cylinder cooling operation" refers specifically to the cooling of one particular cylinder at a time, even though there may be circumstances where cooling of more than one cylinder is requested.

Conditions being met at 502 may further include an indication that onboard energy storage device SOC is above a predetermined level sufficient for conducting the single cylinder cooling operation, without adversely impacting downstream applications (e.g. engine starting, etc.) that utilize energy from the onboard energy storage device or battery.

If, at 502, conditions are not indicated to be met for conducting the single engine cylinder cooling operation, method 500 may proceed to 506. At 506, method 500 may include maintaining current vehicle operating conditions. For example, if the vehicle is at a S/S event but where conditions are not met for conducting the cooling operation, then the vehicle engine may be maintained off, and the electric booster maintained off, etc. If the vehicle is in operation with the engine combusting air and fuel, such conditions may be maintained. In a case where the vehicle is being propelled at least in part via electrical power, such operation may be maintained.

Returning to 502, responsive to conditions being met for conducting the single engine cylinder cooling operation, method 500 may proceed to 510. At 510, method 500 may include parking one overheated cylinder with intake and exhaust valves at least partially open. In the event only one cylinder is scheduled for the cooling operation, that particular cylinder may be parked with its intake and exhaust valves at least partially open. In the event that more than one cylinder is scheduled for the cooling operation, then only one cylinder may first be parked with its intake and exhaust valves at least partially open. In some examples where more than one cylinder is scheduled for the cooling operation, then the controller may make a determination as to which cylinder is overheated to the greatest extent, and that cylinder may be first parked with its intake and exhaust valves at least partially open. In this way, mitigating actions may be undertaken on the cylinder that is overheated to the greatest extent, prior to mitigating actions being undertaken on the other cylinder(s).

In a vehicle configured with TiVCT, such a step may include the first oil pressure-controlled actuator (e.g. 283) for the intake camshaft being controlled via the controller, and may further include the second oil pressure-controlled actuator (e.g. 284) for the exhaust camshaft being controlled via the controller, to ensure that the intake valve for the selected cylinder and the exhaust valve for the selected cylinder are at least partially open. It may be understood that controlling the intake valve and the exhaust valve to be at least partially open may include controlling the intake valve and the exhaust valve to be as open as possible, given inherent constraints of the engine system. In this way, cooling air flow through the cylinder may be maximized, as will be further elaborated below.

In some examples, controlling the intake and exhaust valves to the at least partially open position may include the controller commanding the electric machine (e.g. 52) to control or assist engine rotation such that the intake and exhaust valves are at least partially open.

It may be understood that, parking the cylinder with its intake and exhaust valves being at least partially open may comprise the piston of that cylinder being within a threshold number of degrees (e.g.) 5° of TDC.

While not explicitly illustrated, several other actions may be conducted at step 510. Specifically, the intake throttle (e.g. 20) may be commanded via the controller to a fully open position, the EGR valve (e.g. 152) (where included) may commanded via the controller to a fully closed position, and the canister purge valve (e.g. 179) may be commanded via the controller to a fully closed position. Still further, where included, a wastegate, or wastegate valve (e.g. 91) may be commanded to a fully open position in some examples. By commanding open the wastegate, air routed through the engine (discussed in detail below) may be subjected to less resistance, as compared to when the wastegate is in a fully closed configuration. More specifically, with the wastegate open, air flow may be routed around the more restrictive turbine (e.g. 116), thus encouraging greater air flow through the engine. In a case where the wastegate comprises a spring-loaded wastegate, the wastegate may be maintained closed during the operation, which may not substantially affect the cooling operation as compared to a situation where the wastegate is able to be commanded open.

Proceeding to 514, method 500 may include activating the electric booster (e.g. 155) to direct air through the CAC, and through the selected engine cylinder with its intake and exhaust valves at least partially open. By activating the electric booster, cool air may be directed through the selected cylinder, and may thus serve to cool the selected cylinder. The electric booster may be activated at a predetermined speed, or predetermined power level, the predetermined speed and/or predetermined power level specific to the single engine cylinder cooling operation. More specifically, the predetermined speed and/or predetermined power level may be in some examples be different for the single engine cylinder cooling operation, as compared to the predetermined speed and/or predetermined power level as described for the general engine cooling operation above. However, in other examples, the predetermined speed and/or power level may be the same between the general engine cooling operation and the single engine cylinder cooling operation.

In some examples, the electric booster may be controlled to a speed and/or power level that is a function of the temperature of the single engine cylinder, and the extent of overheating. For example, as the single cylinder temperature increases, the electric booster may be controlled to a higher speed and/or power level, to more effectively cool the cylinder. Furthermore, in some examples a speed and/or power level of the electric booster may be controlled as a function of a learned/predicted duration of the S/S event. For example, under conditions where the S/S event is learned/predicted to be shorter, the speed and/or power level of the electric booster may be increased, in order to effectively cool the cylinder faster. Alternatively, under conditions where the S/S event is learned/predicted to be longer, the speed and/or power level of the electric bosster may be decreased.

In some examples, a pressure sensor (e.g. 165) positioned in the exhaust system downstream of a turbine (e.g. 116) may be utilized to monitor the flow of air directed through the single cylinder. In one example, the flow of air may comprise an expected air flow for the particular single cylinder under conditions where the intake and exhaust valves of that single cylinder are positioned at least partially open. If the air flow is significantly different (e.g. greater than 10% different, for example) than expected, then it may be indicated that there is a potential issue with one or more of the intake/exhaust valve(s), a potential issue with the system (e.g. TiVCT) involving cam timing, etc. In such an example, a malfunction indicator light may be illuminated at the dash alerting the vehicle operator of a request to service the vehicle. If the monitored flow is greater than a degradation threshold different than the expected flow, the cooling methodology may be aborted, and the controller may command the vehicle be propelled via electric power as frequently as possible, to avoid further engine degradation due to overheating.

With the electric booster activated at 514, method 500 may proceed to 518. At 518, method 500 may include continuing to monitor temperature of the single engine cylinder (e.g. via a CHT sensor or in-cylinder temperature sensor), and responsive to cylinder temperature decreasing below a threshold cylinder temperature, the cooling operation may be terminated. More specifically, as discussed above, a temperature at which a single cylinder overheating condition is indicated may comprise a first threshold cylinder temperature. Accordingly, at 518, the threshold engine temperature at which the cooling operation may be terminated may comprise a second threshold cylinder temperature. The second threshold cylinder temperature may be lower (cooler) than the first threshold cylinder temperature. In other words, if the cooling operation simply reduced the cylinder temperature to the first threshold cylinder temperature, then the potential for that cylinder overheating may be highly likely to occur in a short time frame. However, by reducing the cylinder temperature to the second threshold cylinder temperature, below the first threshold cylinder temperature, cylinder temperature may be maintained below the first threshold cylinder temperature for a greater duration and potentially for the rest of the drive cycle in some examples.

If, at 518, cylinder temperature is not indicated to be decreased to or below the second threshold cylinder temperature, method 500 may proceed to 522. At 522, method 500 may include maintaining the electric booster activated with the selected cylinder's intake and exhaust valve maintained at least partially open.

Responsive to the single cylinder cooling operation reducing temperature of the selected cylinder to or below the second threshold cylinder temperature, method 500 may proceed to 526. At 526, method 500 may include indicating whether any other cylinders have been requested to be cooled via the single cylinder cooling operation. If so, method 500 may return to 502, and may include indicating whether conditions are still met for conducting the single cooling operation on the additional cylinder. Similar to that discussed above, conditions may be met if it is indicated that the additional cylinder is above the first threshold cylinder temperature, and if there is indicated to be enough time for conducting the additional cooling operation, prior to a request to restart the engine. Conditions being met may further include an indication that battery SOC is greater than the predetermined SOC level for conducting the single cylinder cooling operation.

It may be understood that the predetermined SOC level for conducting the single engine cylinder cooling operation may be adjusted in some examples, as a function of how many cylinders are selected for the single cylinder cooling operation. For example, the predetermined SOC level may be greater if more than one cylinder is selected for cooling, as opposed to if only one cylinder is selected, for example.

In an example where additional cylinder(s) are selected to be cooled at 526, it may be understood that the method for cooling such additional cylinder(s) may be essentially the same as that described at steps 502-526. Parking the additional cylinder with its intake and exhaust valves at least partially open may include rotating the engine via the electric machine, for example, and may further include controlling first oil pressure-controlled actuator (e.g. 283) and second oil pressure-controlled actuator (e.g. 284) such that the intake and exhaust valves for the particular selected cylinder are controlled to be at least partially open.

At 526, in the event that additional cylinder cooling is not requested, method 500 may proceed to 530. At 530, method 500 may include terminating the single engine cylinder cooling operation. More specifically, terminating the single engine cylinder cooling operation may include the controller sending a signal to the electric booster, actuating it off. Furthermore, the controller may send a signal to the electric machine or motor, commanding the electric machine or motor to rotate the engine unfueled to a desired engine position for engine starting. However, in other examples, the engine may not be rotated subsequent to the single engine cylinder cooling operation being terminated. Furthermore, terminating the single engine cylinder cooling operation may include the controller sending a signal to the wastegate, actuating it to a fully closed position, provided it was commanded open for the general engine cooling operation.

Proceeding to 534, method 500 may include continuing to monitor temperature of the single engine cylinder(s) and/or general engine temperature for the duration of the S/S event. In the event that temperature of one or more single engine cylinder(s) increases to or above the first threshold cylinder temperature, then method 500 may return to 502, where the single engine cylinder cooling operation may again be conducted as described, provided conditions are met for doing so. In an example where for some reason general engine temperature climbs to or above the first threshold engine temperature, then method 500 may include proceeding to method 400, as described above, which may include conducting the general engine cooling operation provided conditions are met for doing so.

Continuing to 538, method 500 may include indicating whether conditions are met for automatically restarting the engine to combust air and fuel. As discussed, a vehicle operator may step down on an accelerator pedal, requesting wheel torque. A requested wheel torque greater than a threshold wheel torque, or an accelerator pedal position greater than a threshold accelerator pedal position, may indicate a request to automatically restart the engine. If, at 538, auto restart conditions are not indicated to be met, method 500 may proceed to 542, and may include maintaining the engine stopped. In other words, current vehicle and engine operating conditions may be maintained and temperature of the engine may be continued to be monitored.

Alternatively, responsive to the auto restart conditions being indicated to be met, method 500 may proceed to 546. At 546, method 500 may include executing the auto restart. Restarting the engine may include the controller commanding a starter motor or electric machine to crank the engine until a threshold engine start speed is reached, and then providing fueling and spark in order for the engine to combust air and fuel. In one example, the engine may be fueled to provide a defined engine speed profile and a target engine torque. Method 500 may then end.

Thus, the flowcharts depicted above with regard to FIGS. 3-5 may enable a method comprising activating an electric compressor in an intake of an engine of a vehicle, to direct an air flow through a first single cylinder of the engine during a start/stop event where the engine is not combusting air and fuel, to reduce a temperature of the first single cylinder to a desired temperature prior to a request to restart the engine. The method may include positioning the first single cylinder with both an intake and an exhaust valve of the first single cylinder in an at least partially open configuration, to direct the air flow through the first single cylinder. Positioning the first single cylinder with both the intake valve and the exhaust valve in the at least partially open configuration may include adjusting a timing of opening of the intake valve and the exhaust valve, via controlling rotation of a first camshaft mechanically coupled to the intake valve, and via controlling rotation of a second camshaft mechanically coupled to the exhaust valve.

The method may further comprise commanding a throttle positioned in the intake of the engine to a fully open position just after (e.g. within 5 seconds) the engine has stopped combusting air and fuel, and just prior to (e.g. within 5 seconds) activating the electric compressor.

In an example where the engine includes a turbine positioned in an exhaust system of the engine, and where the turbine is mechanically coupled to a compressor positioned upstream of the electric compressor in the intake, and further where the exhaust system includes a wastegate passage configured to route fluid flow around the turbine when a wastegate positioned in the wastegate passage is open, the method may include commanding the wastegate fully open after the engine has stopped combusting air and fuel and just prior to activating the electric compressor.

In an example of the method, activating the electric compressor to direct the air flow through the single cylinder may further comprise a duration of the start/stop event being expected or predicted to be sufficient to reduce the temperature of the first single cylinder to the desired temperature prior to the request to restart the engine.

In another example of the method, activating the electric compressor may further comprise activating the electric compressor to a speed or a power level that is a function of one or more of the temperature of the first single cylinder and/or an ambient temperature.

In yet another example of the method, reducing the temperature of the first single cylinder may occur in response to an indication that the first single cylinder is overheating, and in response to an indication that a second single cylinder is overheating, the method may include selecting whether to sequentially cool the first single cylinder and the second single cylinder during the start/stop event, or whether to instead conduct a general cooling operation. In one example, selecting whether to sequentially cool the first and the second single cylinders or whether to conduct the general engine cooling operation is a function of a state of charge of an onboard energy storage device. Furthermore, the general cooling operation may involve activating the electric compressor to direct another air flow through the engine, while the engine is rotated unfueled via a motor.

The flowcharts of FIGS. 3-5 may additionally enable another method comprising, in a first operating condition, where a first temperature of a single cylinder of an engine is indicated to be above a first threshold cylinder temperature, operating the engine in a first mode via activating an electric air compressor positioned in an intake of the engine upstream of a charge air cooler to route a first air flow through the single cylinder but not through other cylinders of the engine. In a second operating condition, where a second temperature of the engine as a whole is indicated to be above a first threshold engine temperature, the method may include operating the engine in a second mode via activating the electric air compressor to route a second air flow through all cylinders of the engine. For example, routing the first air flow through the single cylinder in the first mode may be to reduce the first temperature to a second threshold cylinder, and where routing the second air flow through all cylinders is to reduce the second temperature to a second threshold engine temperature.

The method may further comprise operating the engine in the first mode and the second mode during a start/stop event where the engine is stopped from combusting air and fuel. In one example, operating the engine in the first mode and the second mode may further comprise an indication that the start/stop event is predicted to be of a duration where operating the engine in the first mode is expected or predicted to reduce the first temperature of the single cylinder to the second threshold cylinder temperature or where operating the engine in the second mode is expected to reduce the second temperature of the engine to the second threshold engine temperature, prior to a request to restart the engine combusting air and fuel. The first operating condition and the second operating condition may be identified prior to the start/stop event and while the engine is operating to combust air and fuel, and where, in the first operating condition and/or the second operating condition, taking mitigating action prior to the start/stop event. Such mitigating action may include activating one or more cooling fans to direct cool air toward the engine and/or stopping injection of fuel to the single cylinder in the first operating condition. Such mitigating action may further include activating one or more cooling fans and/or sequentially stopping and then resuming injection of fuel to each of the all cylinders of the engine in a round robin style fashion in the second operating condition.

The method may further comprise commanding a throttle positioned in the intake downstream of the electric air compressor to a fully open position in order to operate the engine in both the first mode and the second mode. Furthermore, under conditions where the engine includes a wastegate positioned in an exhaust system of the engine, the method may include commanding open the wastegate to a fully open position to operate the engine in both the first mode and the second mode.

Still further, the method may include positioning the single cylinder with both a first intake valve and a first exhaust valve coupled to the single cylinder in at least partially open configuration in the first mode, and may include rotating the engine unfueled via a motor in the second mode, where rotating the engine involves opening and closing intake and exhaust valves coupled to each cylinder of the engine.

Turning now to FIG. 6, an example timeline 600 for conducting the single engine cylinder cooling operation, discussed in detail above with regard to FIG. 5, is shown. Timeline 600 includes plot 605, indicating whether fuel injection to engine cylinders is on, or off, over time. Timeline 600 further includes plots 610, 615, 620, and 625, indicating temperature of a first cylinder, second cylinder, third cylinder, and fourth cylinder, respectively. Thus, it may be understood that this example timeline may refer to a vehicle with a four cylinder engine. A first threshold cylinder temperature is indicated for each cylinder, specifically represented by lines 611, 616, 621, and 626. In this example timeline, it may be understood that the first threshold cylinder temperatures are the same between cylinders, though in other examples the first threshold cylinder temperatures may be different between cylinders. It may be further understood that, if temperature of a particular cylinder rises above the first threshold temperature, then that particular cylinder may be indicated to be overheating. In this example timeline, the second cylinder overheats, discussed below, and as such a second threshold cylinder temperature is represented by line 617.

Timeline 600 further includes plot 630, indicating whether a S/S event is indicated, over time. Timeline 600 further includes plot 635, indicating a position of an intake throttle (e.g. 20), over time. Timeline 600 further includes plot 640, indicating exhaust valve status for the second cylinder, and plot 645 indicating intake valve status for the second cylinder. It may be understood that only cylinder 2 is illustrated as that particular cylinder is indicated to be overheating as will be discussed in detail below. Timeline 600 further includes plot 650, indicating whether the electric booster (e.g. 155) is on, or off, over time. Timeline 600 further includes plot 655, indicating whether an engine start is requested, over time.

At time t0, the engine of the vehicle is in operation (plot 605), as fuel is being injected to engine cylinders. Each of the first through fourth engine cylinders are not indicated to be in an overheating condition, as each are below their respective first threshold cylinder temperatures. A S/S event is not indicated (plot 630), and throttle position (plot 635) is a function of driver demand. The electric booster is not in operation (plot 650), and as the engine is in operation, an engine start request is not indicated (plot 655).

Between time t0 and t1, it may be understood that each of the intake/exhaust valves for each cylinder open and close as a function of the different strokes of the engine cycle. However, only the intake and exhaust valve status for the second cylinder (plots 645 and 640, respectively) are illustrated. Illustrated for the second cylinder valve status is the status of the intake and exhaust valves, as a function of the particular stroke of the engine cycle. The engine cycle includes an exhaust stroke (E), an intake stroke (I), a compression stroke (C), and a power stroke (P). Illustrated between time t0 and t1, the intake and exhaust valves open and close as a function of engine cycle stroke.

At time t1, temperature of the second cylinder rises to above the first threshold cylinder temperature. In other words, at time t1, it is indicated that the second cylinder comprises an overheating condition. Accordingly, with the second cylinder indicated to be overheating, a single engine cylinder cooling operation is scheduled for the next S/S event. Such scheduling may be conducted via the controller, for example. While not explicitly illustrated, between time t1 and t2, mitigating actions may be taken in an attempt to reduce temperature of the second cylinder. Such examples may include stopping fuel injection to the second cylinder, activating cooling fans, etc. In this example, it may be understood that cooling fans are activated between time t1 and t2, although other strategies as discussed above may be conducted without departing from the scope of this disclosure.

At time t2, a S/S event is indicated. Accordingly, fuel injection to the engine cylinders is stopped (plot 605). Furthermore, with the S/S event indicated, the throttle is controlled to a fully open position (plot 635). It may be further understood that, at time t2, conditions are indicated to be met for conducting the single engine cylinder cooling operation, discussed in detail with regard to step 502 of method 500. While not explicitly illustrated, in examples where the vehicle system includes a wastegate, the wastegate may be commanded open at time t2, responsive to conditions being indicated to be met.

With conditions being indicated to be met at t2, the engine may be controlled to position the intake and exhaust valve corresponding to the overheated cylinder (second cylinder in this example) such that both the intake and exhaust valves are at least partially open. As discussed above, actuators such as the first oil pressure-controlled actuator (e.g. 283) and the second oil pressure-controlled actuator (e.g. 284) associated with an intake camshaft (e.g. 281) and exhaust camshaft (e.g. 282), respectively, may be actuated via the controller to position the engine with the intake and exhaust valves for the second cylinder at least partially open. In some examples, such action may be conducted while the engine spins to rest, while in other examples, the electric machine may be utilized to assist or control engine rotation to the position where the intake and exhaust valves corresponding to the second cylinder are at least partially open. Accordingly, at time t3, the intake (plot 645) and exhaust valve (plot 640) are positioned as such.

With conditions met for conducting the single engine cylinder cooling operation, and with the throttle commanded open (and the wastegate commanded open, where included), the electric booster is commanded on at time t3. As discussed, the electric booster may be controlled to a predetermined speed and/or predetermined power level, or in some examples the speed/power level may be a function of the extent of cylinder overheating, and may thus be further a function of ambient temperature, mass air flow through the engine summed over the current drive cycle, etc.

With the electric booster activated at time t3, air may be routed through a CAC (e.g. 118), thus cool air may be directed through the overheated cylinder, acting to cool said overheated cylinder. Accordingly, between time t3 and t4, the temperature of the second cylinder begins to decline (plot 615).

At time t4, temperature of the second cylinder reaches the second threshold cylinder temperature, represented by line 617. With the second cylinder temperature having been reduced via the cooling operation to the second threshold cylinder temperature, the electric booster is deactivated (plot 650). While not explicitly shown, if the wastegate were commanded open to conduct the cooling operation, then the wastegate may be commanded closed at time t4. Temperature of the second cylinder is continued to be monitored between time t4 and t5, and the temperature remains below the first threshold cylinder temperature.

At time t5, an engine restart is requested (plot 655). While not explicitly illustrated restarting the engine may include a starter motor or electric machine rotating the engine to a predetermined speed, and then commencing fuel injection (and spark). Accordingly, with the engine restart requested, it may be understood that the starter motor or electric machine is utilized between time t5 and t6 to commence rotating the engine, and at time t6, fuel injection (and spark) are provided (plot 605). With the engine rotating beginning at time t5, second cylinder intake and exhaust valves commence operation. Between time t6 and t7, the engine is propelled via the engine, and throttle position changes as a function of driver demand.

Turning now to FIG. 7, an example timeline 700 for conducting the general engine cooling operation, discussed in detail above with regard to FIG. 4, is shown. Timeline 700 includes plot 705, indicating whether fuel injection is being provided to the engine (on) or not (off) over time. Timeline 700 further includes plot 710, indicating engine temperature (general engine temperature), over time. Line 711 represents the first threshold engine temperature, where if engine temperature is at or above the first threshold engine temperature, it may be understood the engine is overheated. Line 712 represents the second threshold engine temperature, which, if reached during the general engine cooling operation, may result in the general cooling operation being terminated, as the desired result of cooling the engine to the second threshold engine temperature has been accomplished. Timeline 700 further includes plot 715, indicating whether a S/S event is indicated, or not, over time. Timeline 700 further includes plot 720, indicating whether an intake throttle (e.g. 20) is open or closed (or somewhere in between), over time. Timeline 700 further includes plot 725, indicating a status of an electric machine (e.g. 52), over time. Timeline 700 further includes plot 730, indicating engine speed (engine RPM), over time. Timeline 700 further includes plot 735, indicating a status of the electric booster (e.g. 155), over time. Timeline 700 further includes plot 740, indicating whether an engine start is requested, over time.

At time t0, the engine is in operation and fuel is being provided to engine cylinders (plot 705). In other words, the vehicle is being propelled via the engine. The electric machine is off (plot 725), the electric booster is off (plot 735), and as the engine is in operation, an engine start is not requested (plot 740). Engine temperature (plot 710) is below the first threshold engine temperature, and thus the engine is not indicated to be overheating at time t0. A S/S event is not indicated (plot 715).

Between time t0 and t1, the throttle position (plot 720) and engine speed (plot 730) varies as a function of driver demand. At time t1, an engine overheating condition is indicated (plot 710), as engine temperature has risen to the first threshold engine temperature. Accordingly, between time t1 and t2, while not explicitly illustrated it may be understood that mitigating actions that include activating one or more cooling fans are undertaken to reduce the engine temperature. In some examples (not illustrated here), mitigating actions may include conducting a round-robin-style cooling operation, that involves cutting off fuel to one cylinder at a time while maintaining opening of intake and exhaust valves, to pump cold air through the engine. However, in this example timeline, cooling fans are understood to be activated.

With the engine overheating condition identified at time t1, a general engine cooling operation is scheduled for the next S/S event. At time t2, the next S/S event is indicated to be requested (plot 715). Accordingly, fuel injection to the engine cylinders is stopped (plot 705). Between time t2 and t3, it may be understood that conditions are indicated to be met for conducting the general engine cooling operation, discussed in detail above with regard to step 402 of method 400.

With conditions met for conducting the general engine cooling operation, at time t3, the throttle is commanded to a fully open position (plot 720), and the electric machine is activated (plot 725), to rotate the engine unfueled. Accordingly, between time t3 and t4, engine RPM increases as the electric machine is employed to rotate the engine. It may be understood that the intake valves and exhaust valves operate to open and close while the engine is being rotated. While not explicitly illustrated, in some examples where the vehicle includes a wastegate (e.g. 91), the wastegate may be commanded to a fully open position.

The engine is rotated to achieve a predetermined speed, in this example. The predetermined speed may be a function of engine temperature, ambient temperature, air mass summed over the current drive cycle prior to the current S/S event, etc. With the engine rotating unfueled, at time t4, the electric booster is activated. While not explicitly illustrated, the electric booster is controlled to a predetermined speed, or predetermined power level. In some examples such a predetermined speed and/or power level may be a function of engine temperature, ambient temperature, air mass summed over the current drive cycle, etc.

With the electric booster activated, air is directed through the CAC (e.g. 118), thus routing cool air through the engine which is being rotated unfueled. While not explicitly illustrated, it may be understood that rotating the engine is conducted such that the engine rotates in the same direction as that of when the engine is combusting air and fuel. Such rotation generates a vacuum in the intake, and a pressure in the exhaust, and thus assists in drawing air from the electric booster through the engine. Accordingly, between time t4 and t5, engine temperature decreases.

At time t5, engine temperature (plot 710) reaches the second threshold engine temperature (line 712). Accordingly, the electric machine is deactivated (plot 725) via the controller, and the electric booster (plot 735) is turned off via the controller. Accordingly, between time t5 and t6, the engine spins to rest (plot 730). Engine temperature is continued to be monitored between time t5 and t6, and temperature remains below the first threshold engine temperature, such that additional engine cooling is not requested.

At time t6, an engine start is requested (plot 740), and accordingly the electric machine is employed (plot 725) to rotate the engine. Accordingly, engine speed increases (plot 730) between time t6 and t7, and at time t7 fuel is provided to the engine (plot 705) while the electric machine is deactivated (plot 725). Between time t7 and t8, with the engine combusting air and fuel, throttle position and engine RPM vary according to driver demand.

In this way, under conditions where an overheating engine conditions is identified, depending on whether the overheating engine condition is confined to a single engine cylinder (or cylinders in some examples), or the engine as a whole, an effective strategy may be selected to mitigate the overheating engine condition which may effectively cool the single engine cylinder or engine as a whole, while effectively utilizing power stored in an onboard energy storage device. In doing so, engine degradation due to overheating conditions may be reduced or avoided.

The technical effect is to recognize that under conditions where an engine of a hybrid vehicle is stopped from combusting air and fuel at a start/stop event, temperatures of the engine and engine cylinders may continue to rise, and that in a case where one or more cylinders or the engine as a whole is indicated to be overheating, such further rise may result in engine degradation. Thus, a further technical effect is to recognize that it may in some examples be more energy efficient to cool a single engine cylinder or cylinders one at a time, in sequential fashion, whereas in other examples it may be desirable to cool all engine cylinders. A further technical effect is to recognize that an electric air compressor positioned in an intake of the engine may be employed to provide cooling air flow to the engine or individual engine cylinder(s), under conditions where the engine is stopped from combusting air and fuel. A still further technical effect is to recognize that such cooling air flow may be increased under such circumstances, where an intake throttle and a wastegate are commanded fully open while the electric air compressor is activated. By employing the above-mentioned technical effects as related to the systems and methodology discussed herein, engine degradation may be reduced or avoided in response to engine overheating conditions for vehicles configured with start/stop capabilities.

The systems described herein, and with reference to FIGS. 1-2, along with the methods described herein, and with reference to FIGS. 3-5, may enable one or more systems and one or more methods. In one example, a method comprises activating an electric compressor in an intake of an engine of a vehicle, to direct an air flow through a first single cylinder of the engine during a start/stop event where the engine is not combusting air and fuel, to reduce a temperature of the first single cylinder to a desired temperature prior to a request to restart the engine. In a first example of the method, the method further comprises positioning the first single cylinder with both an intake valve and an exhaust valve of the first single cylinder in an at least partially open configuration, to direct the air flow through the first single cylinder. A second example of the method optionally includes the first example, and further includes wherein positioning the first single cylinder with both the intake valve and the exhaust valve in the at least partially open configuration includes adjusting a timing of opening of the intake valve and the exhaust valve, via controlling rotation of a first camshaft mechanically coupled to the intake valve, and via controlling rotation of a second camshaft mechanically coupled to the exhaust valve. A third example of the method optionally includes any one or more or each of the first through second examples and further comprises commanding a throttle positioned in the intake of the engine to a fully open position just after the engine has stopped combusting air and fuel and just prior to activating the electric compressor. A fourth example of the method optionally includes any one or more or each of the first through third examples, and further includes wherein the engine includes a turbine positioned in an exhaust system of the engine, the turbine mechanically coupled to a compressor positioned upstream of the electric compressor in the intake, and where the exhaust system includes a wastegate passage configured to route fluid flow around the turbine when a wastegate positioned in the wastegate passage is open; and wherein the wastegate is commanded to a fully open position just after the engine has stopped combusting air and fuel and just prior to activating the electric compressor. A fifth example of the method optionally includes any one or more or each of the first through fourth examples, and further includes wherein activating the electric compressor to direct the air flow through the first single cylinder further comprises a duration of the start/stop event expected or predicted to be sufficient to reduce the temperature of the first single cylinder to the desired temperature prior to the request to restart the engine. A sixth example of the method optionally includes any one or more or each of the first through fifth examples, and further includes wherein activating the electric compressor further comprises activating the electric compressor to a speed or a power level that is a function of one or more of the temperature of the first single cylinder and/or an ambient temperature. A seventh example of the method optionally includes an one or more or each of the first through sixth examples, and further includes wherein reducing the temperature of the first single cylinder occurs in response to an indication that the first single cylinder is overheating; and in response to an indication that a second single cylinder is overheating, selecting whether to sequentially cool the first single cylinder and the second single cylinder during the start/stop event, or whether to conduct a general engine cooling operation. An eighth example of the method optionally includes any one or more or each of the first through seventh examples, and further includes wherein selecting whether to sequentially cool the first and the second single cylinders or whether to conduct the general engine cooling operation is a function of a state of charge of an onboard energy storage device. A ninth example of the method optionally includes any one or more or each of the first through eighth examples, and further includes wherein the general engine cooling operation involves activating the electric compressor to direct another air flow through the engine, while the engine is rotated unfueled via a motor.

Another example of a method comprises in a first operating condition, where a first temperature of a single cylinder of an engine is indicated to be above a first threshold cylinder temperature, operating the engine in a first mode via activating an electric air compressor positioned in an intake of the engine upstream of a charge air cooler to route a first air flow through the single cylinder but not through other cylinders of the engine; and in a second operating condition, where a second temperature of the engine as a whole is indicated to be above a first threshold engine temperature, operating the engine in a second mode via activating the electric air compressor to route a second air flow through all cylinders of the engine. In a first example of the method, the method further includes wherein routing the first air flow through the single cylinder in the first mode is to reduce the first temperature to a second threshold cylinder temperature; and wherein routing the second air flow through all cylinders is to reduce the second temperature to a second threshold engine temperature. A second example of the method optionally includes the first example, and further comprises operating the engine in the first mode and the second mode during a start/stop event where the engine is stopped from combusting air and fuel; and wherein operating the engine in the first mode and the second mode further comprises an indication that the start/stop event is predicted to be of a duration where operating the engine in the first mode is expected to reduce the first temperature of the single cylinder to the second threshold cylinder temperature or where operating the engine in the second mode is expected to reduce the second temperature of the engine to the second threshold engine temperature, prior to a request to restart the engine combusting air and fuel. A third example of the method optionally includes any one or more or each of the first through second examples, and further includes wherein the first operating condition and the second operating conditions are identified while the engine is operating to combust air and fuel, and where, in the first operating condition and/or the second operating condition, taking mitigating action prior to the start/stop event, the mitigating action including one or more of activating one or more cooling fans to direct cool air toward the engine and/or stopping injection of fuel to the single cylinder in the first operating condition; and activating one or more cooling fans and/or sequentially stopping and then resuming injection of fuel to each of the all cylinders of the engine in a round robin style fashion in the second operating condition. A fourth example of the method optionally includes any one or more or each of the first through third examples, and further comprises commanding a throttle positioned in the intake downstream of the electric air compressor to a fully open position in order to operate the engine in both the first mode and the second mode; and under conditions where the engine includes a wastegate positioned in an exhaust system of the engine, commanding open the wastegate to a fully open position to operate the engine in both the first mode and the second mode. A fifth example of the method optionally includes any one or more or each of the first through fourth examples, and further includes wherein operating the engine in the first mode further comprises positioning the single cylinder with both a first intake valve and a first exhaust valve coupled to the single cylinder in at least partially open configurations; and wherein operating the engine in the second mode further comprises rotating the engine unfueled via a motor, and where rotating the engine involves opening and closing intake and exhaust valves coupled to each cylinder of the engine.

A system for a hybrid vehicle comprises an engine, including an intake and an exhaust; a plurality of engine cylinders, each cylinder including intake and exhaust valves; an electric air compressor, coupled to the intake upstream of a charge air cooler, the charge air cooler upstream of an intake throttle; a first actuator configured to control rotation of a first camshaft mechanically coupled to the intake valves of the plurality of engine cylinders; a second actuator configured to control rotation of a second camshaft mechanically coupled to the exhaust valves of the plurality of engine cylinders; a start/stop system configured to automatically stop the engine from combusting air and fuel in response to a set of predetermined operating conditions being met; and a controller storing instructions in non-transitory memory that, when executed, cause the controller to: activate the electric air compressor at a start/stop event where the engine is stopped from combusting air and fuel, to flow cool air through a single cylinder of the engine under conditions where a first temperature of the single cylinder is above a first threshold cylinder temperature, but where a second temperature of the engine is below a first threshold engine temperature; and where activating the electric air compressor to flow cool air through the single cylinder further comprises commanding open the throttle to a fully open position, and controlling the first actuator and the second actuator to position an intake valve and an exhaust valve of the single cylinder to at least partially open configurations. In a first example of the system, the system further comprises a wireless communication device; an on-board navigation system; wherein the controller stores further instructions to: retrieve information related to a predicted duration of the start/stop event via the wireless communication device and/or the on-board navigation system; and activate the electric air compressor to flow cool air through the single cylinder at the start/stop event responsive to the start/stop event being predicted to be of a duration greater than an amount of time predicted to reduce the first temperature of the single cylinder to a desired temperature. A second example of the system optionally includes the first example, and further comprises a turbine positioned in the exhaust, the turbine mechanically coupled to a mechanically-driven compressor positioned upstream of the electric air compressor; a wastegate passage including an actuatable wastegate, the wastegate passage configured to route fluid flow around the turbine under conditions when the actuatable wastegate is open; and wherein the controller stores further instructions to command open the wastegate at the start/stop event and just prior to activating the electric air compressor. A third example of the system optionally includes any one or more or each of the first through second examples, and further comprises a motor, configured to rotate the engine; and wherein the controller stores further instructions to activate the electric air compressor and rotate the engine unfueled under conditions where the second temperature of the engine is greater than the first threshold engine temperature, to cool the plurality of engine cylinders, rather than flowing cool air through the single cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
activating an electric compressor in an intake of an engine of a vehicle, to direct an air flow through a first single cylinder of the engine during a start/stop event where the engine is not combusting air and fuel, to reduce a temperature of the first single cylinder to a desired temperature prior to a request to restart the engine, wherein reducing the temperature of the first single cylinder occurs in response to an indication that the first single cylinder is overheating; and
in response to an indication that a second single cylinder is overheating, selecting whether to sequentially cool the first single cylinder and the second single cylinder during the start/stop event, or whether to conduct a general engine cooling operation, wherein selecting whether to sequentially cool the first and the second single cylinders or whether to conduct the general engine cooling operation is a function of a state of charge of an onboard energy storage device.

2. The method of claim 1, further comprising positioning the first single cylinder with both an intake valve and an exhaust valve of the first single cylinder in an at least partially open configuration, to direct the air flow through the first single cylinder.

3. The method of claim 2, wherein positioning the first single cylinder with both the intake valve and the exhaust valve in the at least partially open configuration includes adjusting a timing of opening of the intake valve and the exhaust valve, via controlling rotation of a first camshaft mechanically coupled to the intake valve, and via controlling rotation of a second camshaft mechanically coupled to the exhaust valve.

4. The method of claim 1, further comprising commanding a throttle positioned in the intake of the engine to a fully open position just after the engine has stopped combusting air and fuel and just prior to activating the electric compressor.

5. The method of claim 1, wherein the engine includes a turbine positioned in an exhaust system of the engine, the turbine mechanically coupled to a compressor positioned upstream of the electric compressor in the intake, and where the exhaust system includes a wastegate passage configured to route fluid flow around the turbine when a wastegate positioned in the wastegate passage is open; and
wherein the wastegate is commanded to a fully open position just after the engine has stopped combusting air and fuel and just prior to activating the electric compressor.

6. The method of claim 1, wherein activating the electric compressor to direct the air flow through the first single cylinder further comprises a duration of the start/stop event expected or predicted to be sufficient to reduce the temperature of the first single cylinder to the desired temperature prior to the request to restart the engine.

7. The method of claim 1, wherein activating the electric compressor further comprises activating the electric compressor to a speed or a power level that is a function of one or more of the temperature of the first single cylinder and/or an ambient temperature.

8. The method of claim 1, wherein the general engine cooling operation involves activating the electric compressor to direct another air flow through the engine, while the engine is rotated unfueled via a motor.

9. A method comprising:
in a first operating condition, where a first temperature of a single cylinder of an engine is indicated to be above a first threshold cylinder temperature, operating the engine in a first mode via activating an electric air compressor positioned in an intake of the engine upstream of a charge air cooler to route a first air flow through the single cylinder but not through other cylinders of the engine; and
in a second operating condition, where a second temperature of the engine as a whole is indicated to be above a first threshold engine temperature, operating the engine in a second mode via activating the electric air compressor to route a second air flow through all cylinders of the engine.

10. The method of claim 9, wherein routing the first air flow through the single cylinder in the first mode is to reduce the first temperature to a second threshold cylinder temperature; and
wherein routing the second air flow through all cylinders is to reduce the second temperature to a second threshold engine temperature.

11. The method of claim 10, further comprising operating the engine in the first mode and the second mode during a start/stop event where the engine is stopped from combusting air and fuel; and
wherein operating the engine in the first mode and the second mode further comprises an indication that the start/stop event is predicted to be of a duration where operating the engine in the first mode is expected to reduce the first temperature of the single cylinder to the second threshold cylinder temperature or where operating the engine in the second mode is expected to reduce the second temperature of the engine to the second threshold engine temperature, prior to a request to restart the engine combusting air and fuel.

12. The method of claim 11, wherein the first operating condition and the second operating condition are identified while the engine is operating to combust air and fuel, and where, in the first operating condition and/or the second operating condition, taking mitigating action prior to the start/stop event, the mitigating action including one or more of activating one or more cooling fans to direct cool air toward the engine and/or stopping injection of fuel to the single cylinder in the first operating condition; and activating one or more cooling fans and/or sequentially stopping and then resuming injection of fuel to each of the all cylinders of the engine in a round robin style fashion in the second operating condition.

13. The method of claim 9, further comprising commanding a throttle positioned in the intake downstream of the electric air compressor to a fully open position in order to operate the engine in both the first mode and the second mode; and under conditions where the engine includes a wastegate positioned in an exhaust system of the engine, commanding open the wastegate to a fully open position to operate the engine in both the first mode and the second mode.

14. The method of claim 9, wherein operating the engine in the first mode further comprises positioning the single cylinder with both a first intake valve and a first exhaust valve coupled to the single cylinder in at least partially open configurations; and wherein operating the engine in the second mode further comprises rotating the engine unfueled via a motor, and where rotating the engine involves opening and closing intake and exhaust valves coupled to each cylinder of the engine.

15. A system for a hybrid vehicle, comprising:
an engine, including an intake and an exhaust;
a plurality of engine cylinders, each cylinder including intake and exhaust valves;
an electric air compressor, coupled to the intake upstream of a charge air cooler, the charge air cooler upstream of an intake throttle;
a first actuator configured to control rotation of a first camshaft mechanically coupled to the intake valves of the plurality of engine cylinders;
a second actuator configured to control rotation of a second camshaft mechanically coupled to the exhaust valves of the plurality of engine cylinders;
a start/stop system configured to automatically stop the engine from combusting air and fuel in response to a set of predetermined operating conditions being met; and
a controller storing instructions in non-transitory memory that, when executed, cause the controller to:

activate the electric air compressor at a start/stop event where the engine is stopped from combusting air and fuel, to flow cool air through a single cylinder of the engine under conditions where a first temperature of the single cylinder is above a first threshold cylinder temperature, but where a second temperature of the engine is below a first threshold engine temperature; and where activating the electric air compressor to flow cool air through the single cylinder further comprises commanding open the throttle to a fully open position, and controlling the first actuator and the second actuator to position an intake valve and an exhaust valve of the single cylinder to at least partially open configurations.

16. The system of claim 15, further comprising:
a wireless communication device;
an on-board navigation system;
    wherein the controller stores further instructions to:
        retrieve information related to a predicted duration of the start/stop event via the wireless communication device and/or the on-board navigation system; and
        activate the electric air compressor to flow cool air through the single cylinder at the start/stop event responsive to the start/stop event being predicted to be of a duration greater than an amount of time predicted to reduce the first temperature of the single cylinder to a desired temperature.

17. The system of claim 16, further comprising:
a turbine positioned in the exhaust, the turbine mechanically coupled to a mechanically-driven compressor positioned upstream of the electric air compressor;
a wastegate passage including an actuatable wastegate, the wastegate passage configured to route fluid flow around the turbine under conditions when the actuatable wastegate is open; and
wherein the controller stores further instructions to command open the wastegate at the start/stop event and just prior to activating the electric air compressor.

18. The system of claim 16, further comprising:
a motor, configured to rotate the engine; and
wherein the controller stores further instructions to activate the electric air compressor and rotate the engine unfueled under conditions where the second temperature of the engine is greater than the first threshold engine temperature, to cool the plurality of engine cylinders, rather than flowing cool air through the single cylinder.

\* \* \* \* \*